United States Patent
Eom et al.

(10) Patent No.: US 11,690,113 B2
(45) Date of Patent: Jun. 27, 2023

(54) MOBILE DEVICE AND METHOD OF PERFORMING PAIRING USING THE MOBILE DEVICE

(71) Applicant: SAMSUNG ELECTRONICS CO., LTD., Suwon-si (KR)

(72) Inventors: Chungyong Eom, Suwon-si (KR); Dongik Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 17/150,503

(22) Filed: Jan. 15, 2021

(65) Prior Publication Data
US 2021/0227601 A1    Jul. 22, 2021

(30) Foreign Application Priority Data
Jan. 16, 2020 (KR) .................. 10-2020-0006211

(51) Int. Cl.
*H04W 76/14* (2018.01)
*H04B 17/318* (2015.01)
(Continued)

(52) U.S. Cl.
CPC .......... *H04W 76/14* (2018.02); *H04B 17/318* (2015.01); *H04W 4/23* (2018.02);
(Continued)

(58) Field of Classification Search
CPC ......... H04W 76/14; H04W 4/23; H04W 4/80; H04W 12/06; H04W 12/50; H04W 4/023;
(Continued)

(56) References Cited

U.S. PATENT DOCUMENTS 8,897,825 B2 * 11/2014 Suzuki .................. H04B 7/26
455/509
9,042,829 B2 * 5/2015 Palin .................. H04W 8/005
370/335
(Continued)

FOREIGN PATENT DOCUMENTS

JP      2006-174383 A    6/2006
JP      6495844 B2       4/2019
(Continued)

OTHER PUBLICATIONS

"Proximity Based IoT Device Authentication"; Zhang et al.; IEEE INFOCOM 2017—IEEE Conference on Computer Communications (Year: 2017).*
(Continued)

*Primary Examiner* — Benjamin H Elliott, IV
(74) *Attorney, Agent, or Firm* — Sughrue Mion, PLLC

(57) ABSTRACT

An operating method of a mobile device for performing pairing with an electronic device, including receiving a reception wireless signal from the electronic device; in response to determining that a strength of the reception wireless signal is equal to or greater than a proximity threshold for determining proximity to the electronic device, obtaining sensing information about a movement of the mobile device using at least one sensor of the mobile device; adapting a touch threshold for determining a touch with the electronic device, based on the sensing information; and in response to determining that the strength of the reception wireless signal is equal to or greater than the adapted touch threshold, performing the pairing with the electronic device.

20 Claims, 21 Drawing Sheets

(51) Int. Cl.
*H04W 12/06* (2021.01)
*H04W 4/80* (2018.01)
*H04W 12/50* (2021.01)
*H04W 4/23* (2018.01)

(52) U.S. Cl.
CPC ............. *H04W 4/80* (2018.02); *H04W 12/06* (2013.01); *H04W 12/50* (2021.01)

(58) Field of Classification Search
CPC ....... H04W 4/70; H04W 24/08; H04W 8/005; H04W 12/63; H04W 4/025; H04W 88/02; H04B 17/318
See application file for complete search history.

(56) References Cited

U.S. PATENT DOCUMENTS

| | | | | |
|---|---|---|---|---|
| 9,144,093 | B2* | 9/2015 | Hahm | H04L 41/0806 |
| 9,157,991 | B2* | 10/2015 | Lipman | H04W 24/00 |
| 9,753,562 | B2* | 9/2017 | Reunamaki | H04W 4/023 |
| 9,913,230 | B1* | 3/2018 | Tyagi | H04W 52/383 |
| 10,154,367 | B2* | 12/2018 | James | H04L 43/16 |
| 2011/0050618 | A1* | 3/2011 | Murphy | G06F 3/0446 345/174 |
| 2013/0147752 | A1* | 6/2013 | Simmons | G06F 3/0443 345/174 |
| 2014/0191950 | A1* | 7/2014 | Park | G06F 1/1652 345/156 |
| 2015/0261375 | A1* | 9/2015 | Leigh | G06F 3/04182 345/174 |
| 2016/0124574 | A1* | 5/2016 | Rouaissia | G06F 3/044 345/174 |
| 2016/0188085 | A1* | 6/2016 | Leigh | G06F 3/042 345/174 |
| 2016/0249158 | A1* | 8/2016 | Tredoux | H04W 8/005 |
| 2016/0291770 | A1* | 10/2016 | Kocienda | G06F 3/0484 |
| 2017/0201852 | A1* | 7/2017 | Kuang | H04W 12/06 |
| 2017/0208425 | A1* | 7/2017 | Fu | H04L 63/107 |
| 2017/0235410 | A1* | 8/2017 | Costa | G06F 3/04166 345/174 |
| 2017/0249048 | A1* | 8/2017 | Hill | G06F 1/1626 |
| 2018/0067712 | A1* | 3/2018 | Behzadi | G06F 3/14 |
| 2019/0364380 | A1* | 11/2019 | Khawand | H04B 17/318 |
| 2020/0133476 | A1* | 4/2020 | Yin | G06F 3/0442 |
| 2020/0178056 | A1* | 6/2020 | Fu | H04M 1/72412 |
| 2021/0227601 | A1* | 7/2021 | Eom | H04W 76/14 |

FOREIGN PATENT DOCUMENTS

KR 1020140090855 A 7/2014
KR 10-2015-0061974 A 6/2015

OTHER PUBLICATIONS

International Search Report (PCT/ISA/210) and Written Opinion (PCT/ISA/237) dated Apr. 19, 2021 issued by the International Searching Authority in International Application No. PCT/KR2021/000392.
European Search Report, dated Nov. 24, 2022, issued by the European Patent Office, European Application No. 21741708.8.

* cited by examiner

FIG. 14

- OBTAIN IDENTIFICATION INFORMATION FOR IDENTIFYING ELECTRONIC DEVICE — S1401
- EXTRACT, FROM MEMORY, PRE-SET ADAPTATION STANDARD FOR ADAPTING TOUCH THRESHOLD, BASED ON IDENTIFICATION INFORMATION OF ELECTRONIC DEVICE — S1402
- IDENTIFY, FROM EXTRACTED ADAPTATION STANDARD, ADAPTATION INFORMATION OF TOUCH THRESHOLD CORRESPONDING TO MOVEMENT OF MOBILE DEVICE — S1403
- ADAPT ADAPTATION THRESHOLD FOR DETERMINING TOUCH WITH ELECTRONIC DEVICE, ACCORDING TO IDENTIFIED ADAPTATION INFORMATION — S1404

FIG. 15

| MODEL NAME OF ELECTRONIC DEVICE (1501) | INCLINATION OF MOBILE DEVICE (1502) | ADAPTED TOUCH THRESHOLD (1503) |
|---|---|---|
| 1xxxyz23 | 0 | −10dBm |
|  | 45 | −20dBm |
|  | 90 | −15dBm |
| 2xxyzz32 | 0 | −20dBm |
|  | 45 | −30dBm |
|  | 90 | −10dBm |
| 3xyyyz11 | 0 | −5dBm |
|  | 45 | −30dBm |
|  | 90 | −10dBm |

| INCLINATION OF MOBILE DEVICE | ATTENUATION DEGREE OF RECEPTION SIGNAL |
|---|---|
| 0 | 0dB |
| 45 | −5dB |
| 90 | −10dB |
| ... | ... |

MOBILE DEVICE AND METHOD OF PERFORMING PAIRING USING THE MOBILE DEVICE

CROSS-REFERENCE TO RELATED APPLICATION

This application is based on and claims priority under 35 U.S.C. § 119 to Korean Patent Application No. 10-2020-0006211, filed on Jan. 16, 2020, in the Korean Intellectual Property Office, the disclosure of which is incorporated by reference herein in its entirety.

BACKGROUND

1. Field

The disclosure relates to a mobile device configured to perform pairing with an electronic device, and an operating method of the mobile device, and more particularly, to a mobile device capable of performing pairing with an electronic device through touching of the electronic device, and an operating method of the mobile device.

2. Description of Related Art

Internet of things (IoT) devices may include devices capable of communicating with each other by using a chipset and a module in an IoT environment. IoT devices may be any devices that exist in everyday life, and may include not only smart phones but also wearable devices such as smart watches, televisions (TVs), refrigerators, light bulbs, fitness equipment, cameras, speakers, and air conditioners.

With the development of IoT technology, there is an increasing need to connect and control IoT devices that provide various services.

Recently, various functions that are usable in the IoT environment are being continuously developed, and there is a need for studies on a method for simply and conveniently performing pairing between IoT devices to provide various services.

SUMMARY

Provided are a mobile device for performing pairing with an electronic device and an operating method of the mobile device. The two devices may be paired when the mobile device and the electronic device touch each other.

Also, provided is a computer-readable recording medium having recorded thereon a program for executing the operating method on a computer. The technical problems to be solved are not limited to those described above, and other technical problems may be present.

Additional aspects will be set forth in part in the description which follows and, in part, will be apparent from the description, or may be learned by practice of the presented embodiments of the disclosure.

In accordance with an aspect of the disclosure, an operating method of a mobile device for performing pairing with an electronic device includes receiving a reception wireless signal from the electronic device; in response to determining that a strength of the reception wireless signal is equal to or greater than a proximity threshold for determining proximity to the electronic device, obtaining sensing information about a movement of the mobile device using at least one sensor of the mobile device; adapting a touch threshold for determining a touch with the electronic device, based on the sensing information; and in response to determining that the strength of the reception wireless signal is equal to or greater than the adapted touch threshold, performing the pairing with the electronic device.

The operating method may further include transmitting a transmission wireless signal having a pre-set default value according to a pre-set period, wherein based on determining that the strength of the reception wireless signal is equal to or greater than the proximity threshold, a strength of the transmission wireless signal is amplified to a pre-set maximum value.

A strength of a response wireless signal received from the electronic device in response to the transmission wireless signal may be amplified to a value corresponding to the pre-set maximum value.

The sensing information may include at least one of information about the movement of the mobile device or information about an inclination of the mobile device.

The operating method may further include receiving authentication information for authenticating the electronic device, wherein the pairing is performed based on the authentication information.

The operating method may further include receiving identification information for identifying the electronic device, wherein the touch threshold is adapted based on the identification information of the electronic device.

The operating method may further include: obtaining strength information of the reception wireless signal based on the identification information of the electronic device; identifying an attenuation degree of the reception wireless signal according to the movement of the mobile device, based on the sensing information; determining an adaptation degree of the touch threshold, based on the obtained strength information and the attenuation degree; and adapting the touch threshold based on the determined adaptation degree.

The adapting of the touch threshold may include determining an adaptation degree of the touch threshold, based on a pre-set adaptation standard corresponding to the identification information of the electronic device and the sensing information of the mobile device.

The operating method may further include transmitting, to the electronic device, the sensing information about the movement of the mobile device, wherein the transmitted sensing information is used to adapt a threshold for determining that the electronic device has touched the mobile device.

The operating method may further include, based on performing the pairing with the electronic device, activating an application for at least one service from among screen mirroring, data sharing, and device setting registration.

In accordance with an aspect of the disclosure, an operating method of an electronic device for performing pairing with a mobile device includes receiving a reception wireless signal from the mobile device; obtaining sensing information; adapting a touch threshold for determining a touch with the mobile device, based on the sensing information; and in response to determining that a strength of the reception wireless signal is equal to or greater than the adapted touch threshold, performing the pairing with the mobile device.

In accordance with an aspect of the disclosure, a mobile device for performing pairing with an electronic device includes a communication interface; at least one sensor; a memory configured to store one or more instructions; and a processor configured to execute the one or more instructions to: receive, through the communication interface, a reception wireless signal from the electronic device; in response to determining that a strength of the reception wireless signal is equal to or greater than a proximity threshold for determining proximity to the electronic device, obtain sensing information about a movement of the mobile device using the at least one sensor; adapt a touch threshold for determining a touch with the electronic device, based on the sensing information; and in response to determining that the strength of the reception wireless signal is equal to or greater than the adapted touch threshold, perform the pairing with the electronic device.

The processor may be further configured to execute the one or more instructions to: transmit, through the communication interface, a transmission wireless signal having a pre-set default value according to a pre-set period; and based on determining that the strength of the reception wireless signal is equal to or greater than the proximity threshold, a strength of the transmission wireless signal is amplified to a pre-set maximum value.

A strength of a response wireless signal received from the electronic device in response to the transmission wireless signal may be amplified to a value corresponding to the pre-set maximum value.

The sensing information may include at least one of information about the movement of the mobile device or information about an inclination of the mobile device.

The processor may be further configured to execute the one or more instructions to receive, through the communication interface, authentication information for authenticating the electronic device; and perform the pairing with the electronic device based on the authentication information.

The processor may be further configured to execute the one or more instructions to: receive, through the communication interface, identification information for identifying the electronic device; and adapt the touch threshold based on the identification information of the electronic device.

The processor may be further configured to execute the one or more instructions to: obtain strength information of the reception wireless signal based on the identification information of the electronic device; identify an attenuation degree of the reception wireless signal according to the movement of the mobile device, based on the sensing information; determine an adaptation degree of the touch threshold, based on the obtained strength information and the attenuation degree; and adapt the touch threshold based on the determined adaptation degree.

The processor may be further configured to execute the one or more instructions to determine an adaptation degree of the touch threshold, based on a pre-set adaptation standard corresponding to the identification information of the electronic device and the sensing information of the mobile device.

The processor may be further configured to execute the one or more instructions to, based on performing the pairing with the electronic device, activate an application for at least one service from among screen mirroring, data sharing, and device setting registration.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 is a flowchart of an example of adapting a touch threshold based on identification information of an electronic device, according to an embodiment;

FIG. 15 is a table for describing an example of adapting a touch threshold based on identification information of an electronic device, according to an embodiment;

DETAILED DESCRIPTION

Figure 1:
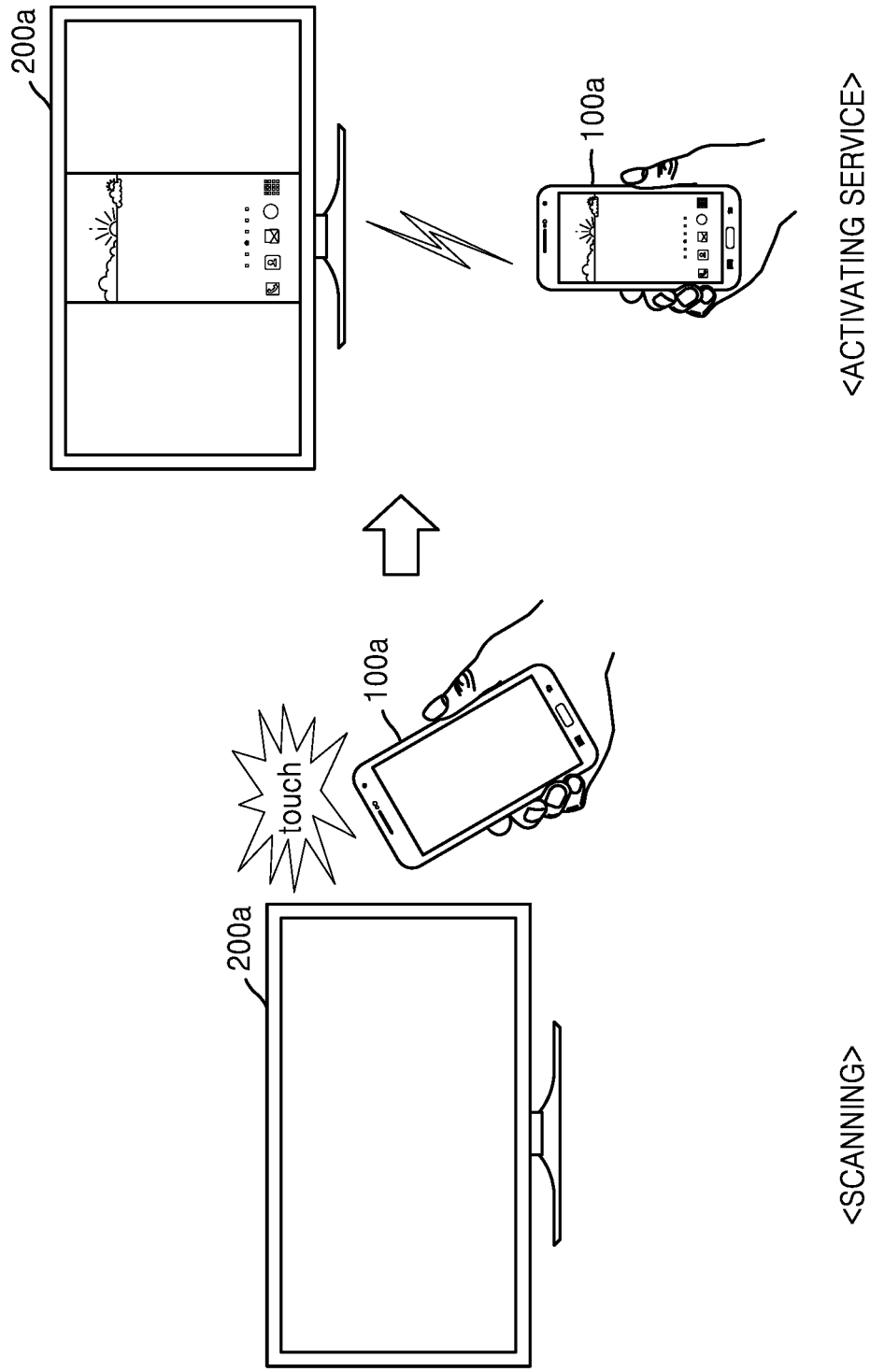
FIG. 1 is a diagram for schematically describing an example in which a mobile device operates, according to an embodiment.

Hereinafter, embodiments of the disclosure will be described in detail with reference to the accompanying drawings such that one of ordinary skill in the art may easily implement the disclosure. However, the disclosure may be implemented in various different forms and is not limited to the embodiments of the disclosure described herein. Also, in the drawings, parts irrelevant to the description may be omitted in order to clearly describe the disclosure, and like reference numerals designate like elements throughout the specification.

Terms used in the disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but are defined based on the meaning of the terms together with the description throughout the specification.

Throughout the disclosure, the expression "at least one of a, b or c" indicates only a, only b, only c, both a and b, both a and c, both b and c, all of a, b, and c, or variations thereof.

While such terms as "first", "second", etc., may be used to describe various components, such components must not be limited to the above terms. The above terms are used only to distinguish one component from another.

Also, the terms used in the disclosure are only used to describe specific embodiments of the disclosure, and are not intended to limit the disclosure. An expression used in the singular encompasses the expression in the plural, unless it has a clearly different meaning in the context. Throughout the specification, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

"The" and similar directives used in the present specification, in particular, in claims, may indicate both singular and plural. Also, unless there is a clear description of an order of operations describing a method according to the disclosure, the operations described may be performed in a suitable order. The disclosure is not limited by the order of description of the described operations.

The phrases "some embodiments of the disclosure" or "an embodiment of the disclosure" appearing in various places in this specification do not necessarily all refer to the same embodiment of the disclosure.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ conventional techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, embodiments of the disclosure will be described in detail with reference to accompanying drawings.

FIG. 1 is a diagram for schematically describing an example in which a mobile device according to an embodiment of the disclosure operates.

Figure 2:
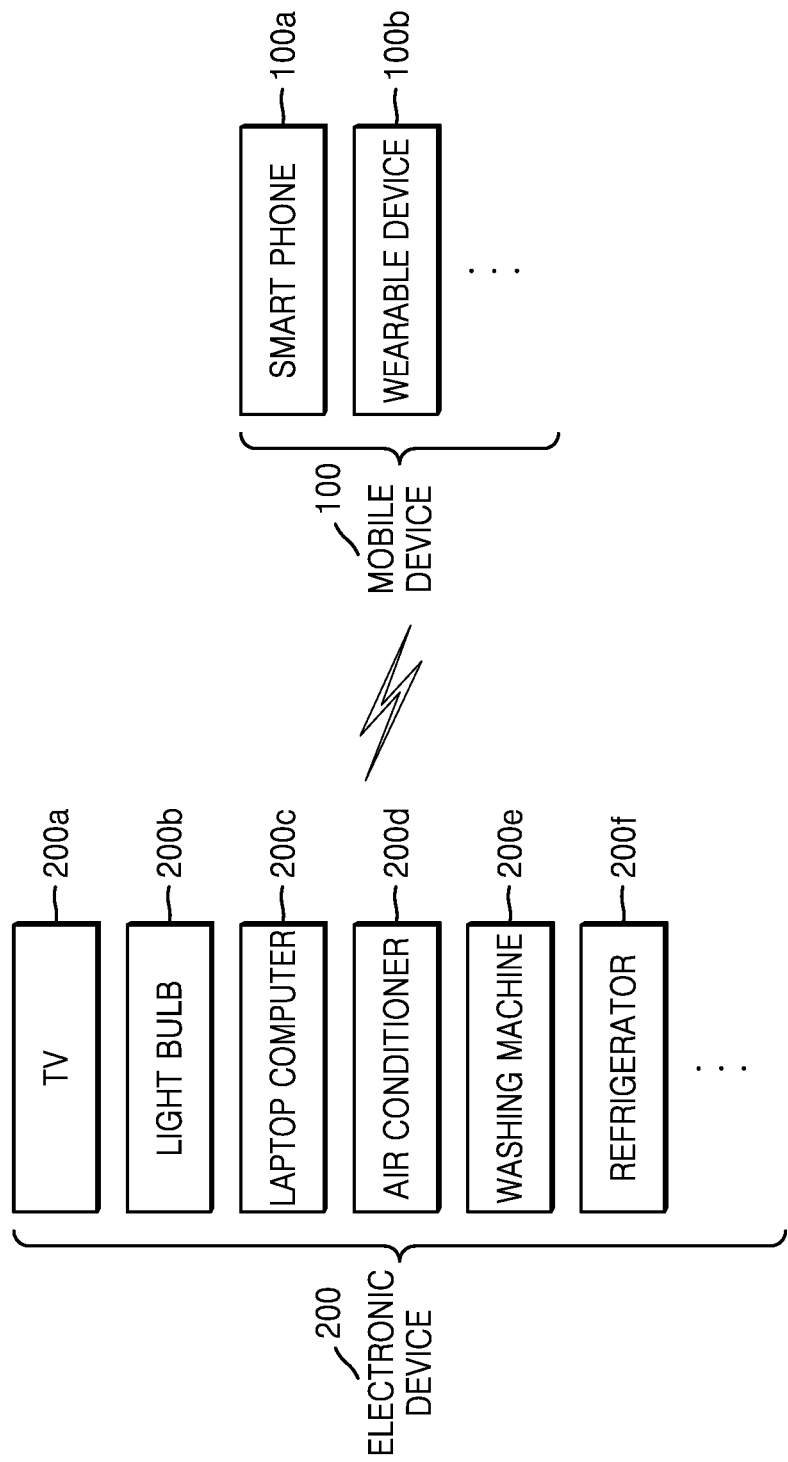
FIG. 2 is a diagram for describing a system including a mobile device and an electronic device, according to an embodiment.

According to an embodiment of the disclosure, communication pairing between a mobile device 100 of FIG. 2 and an electronic device 200 of FIG. 2 is required for the mobile device 100 to remotely control the electronic device 200, the mobile device 100 and the electronic device 200 to exchange data, or various Internet of things (IoT) services to be implemented.

Referring to FIG. 1, the mobile device 100 and the electronic device 200 may be easily paired via an operation of a user touching the mobile device 100, for example, a smart phone 100a, closely to the electronic device 200, for example, a television (TV) 200a. According to an embodiment of the disclosure, the mobile device 100 and the electronic device 200 may use strength of a received signal via wireless signal transmission and reception to pair with each other only via the touching the mobile device 100 to the electronic device 200. According to an embodiment of the disclosure, a value of the strength of the received signal may be obtained as a received signal strength indicator (RSSI) value.

When the mobile device 100 and the electronic device 200 broadcast wireless signals, the mobile device 100 and the electronic device 200 may receive the wireless signals emitted from each other. The mobile device 100 may determine a degree of proximity to the electronic device 200, based on the strength of the received wireless signal. In general, values of strength of signals received between the mobile device 100 and the electronic device 200 may increase as the mobile device 100 and the electronic device 200 get closer to each other.

According to an embodiment of the disclosure, the electronic device 200 may be a device capable of performing a software access point (AP) function. The software AP function may enable a wireless local area network (LAN) client to operate as a wireless AP by realizing a wireless AP function via software. For example, the electronic device 200 may realize Wi-Fi direct via the software AP function.

According to an embodiment of the disclosure, the strength of received signal measured by the mobile device 100 is the strength of a signal transmitted from a software AP of the electronic device 200, and may rapidly increase when the mobile device 100 approaches the software AP.

According to an embodiment of the disclosure, the mobile device 100 may determine that the mobile device 100 and the electronic device 200 are touched when it is determined that the strength of wireless signal received from the electronic device 200 is equal to or greater than a pre-set touch threshold (for example, −10 dBm).

The touch threshold according to an embodiment of the disclosure may be a pre-determined strength of a received signal for determining that the mobile device 100 and the electronic device 200 are touched.

Here, when the mobile device 100 closely approaches the electronic device 200, strength of a signal received within a same distance may be measured differently due to a difference in an inclination, an approaching speed, or the like of the mobile device 100.

For example, strength of a signal received between the mobile device 100 and the electronic device 200 may vary within a certain range depending on an inclination, for example, an inclination of 45° or an inclination of 90°, of the mobile device 100 when touching the electronic device 200, for example, a TV 200a.

According to an embodiment of the disclosure, the mobile device 100 may adapt the touch threshold indicating strength of a signal for determining a touch with the electronic device 200 in consideration of the difference in the measured strength of received signal, the difference caused by the difference in the inclination, the approaching speed or the like of the mobile device 100. For example, the mobile device 100 may lower the touch threshold to a certain range. Accordingly, because the mobile device 100 pairs with the electronic device 200 when it is determined that the strength of signal received from the electronic device 200 is equal to or greater than the lowered touch threshold, pairing with the electronic device 200 may be further facilitated.

According to an embodiment of the disclosure, the pairing between the mobile device 100 and the electronic device 200 may be further smoothly performed in various use environments, for example, different inclinations, approaching speeds, or the like of the mobile device 100 when the user touches the mobile device 100 to the electronic device 200.

According to an embodiment of the disclosure, the mobile device 100 and the electronic device 200 may be easily paired by touching each other, without a separate operation. Due to easy and smooth paring between devices, user convenience may be improved with respect to service implementation of various functions such as data sharing, screen mirroring, and remote controlling in IoT environment.

Referring to FIG. 1, the smart phone 100a may closely touch the TV 200a to be paired with the TV 200a, thereby activating an operation for providing a certain service. For example, the smart phone 100a and the TV 200a may execute an application for screen mirroring. Accordingly, a screen being displayed on a display of the smart phone 100a may be displayed on a display of the TV 200a. The screen mirroring may enable data output on a display of one device to be shared with and controlled by another device.

In FIG. 1, the TV 200a is shown as an example of the electronic device 200, but the electronic device 200 is not limited thereto.

For example, the mobile device 100 may closely touch an electronic device, for example a laptop computer 200c of FIG. 2, to be paired with the laptop computer 200c. The mobile device 100 may be paired with the laptop computer 200c to execute an application for content sharing. For example, the mobile device 100 and the laptop computer 200c may share content by transmitting and receiving picture files, music files, and the like.

Also, according to an embodiment of the disclosure, because the mobile device 100 and the electronic device 200 may perform pairing by touching each other, communication pairing may be easily and conveniently performed even for a device, for example, a light bulb 200b of FIG. 2, that does not include a physical button or display for a user input.

For example, the mobile device 100 may closely touch an electronic device. for example the light bulb 200b, in order to be paired with the light bulb 200b. When the mobile device 100 is paired with the light bulb 200b, the mobile device 100 may initially set and register the light bulb 200b as a controlled device or remotely control operations of the light bulb 200b.

Figure 24:
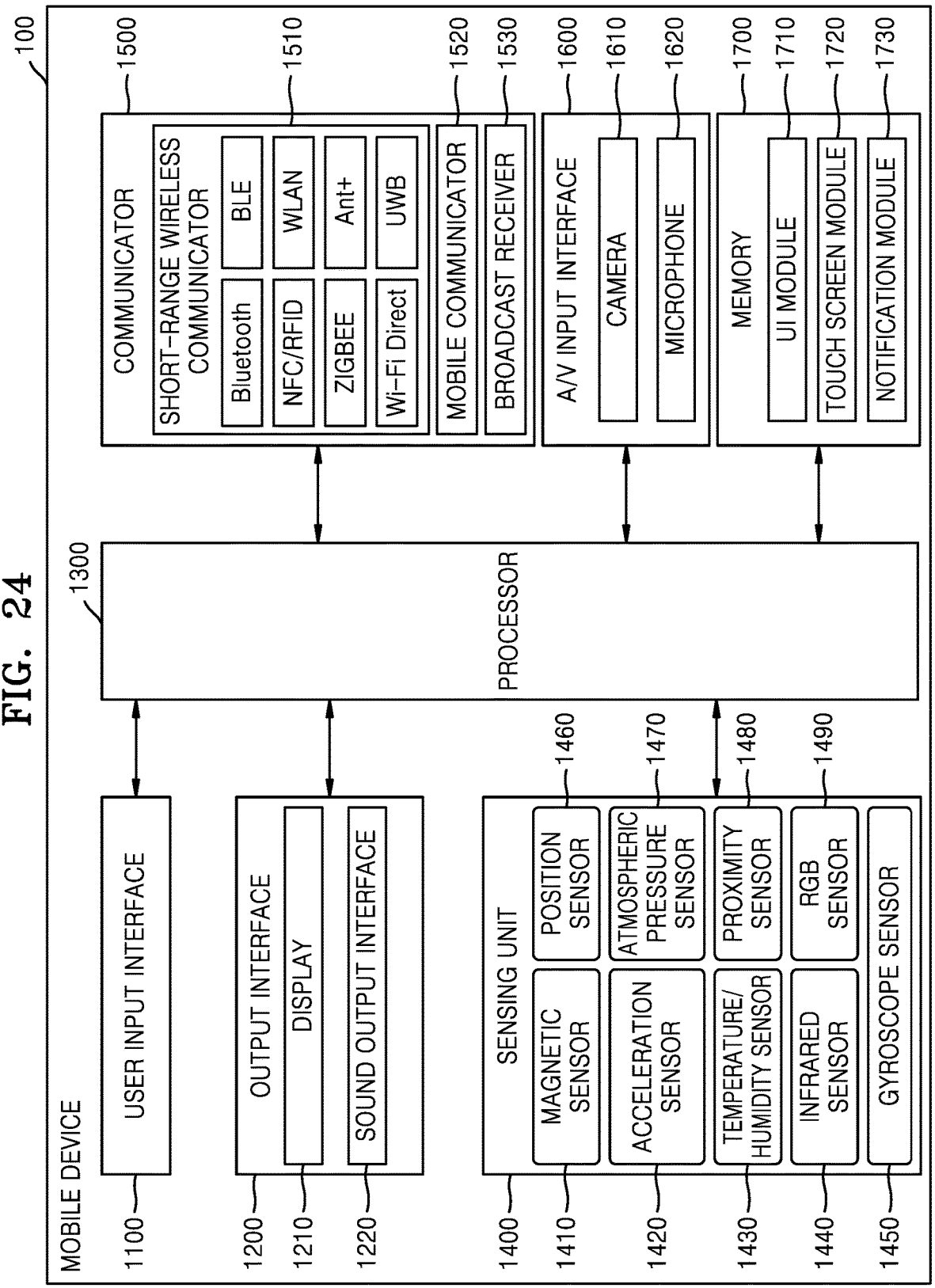
FIG. 24 is a detailed block diagram of a mobile device according to an embodiment.
Figure 25:
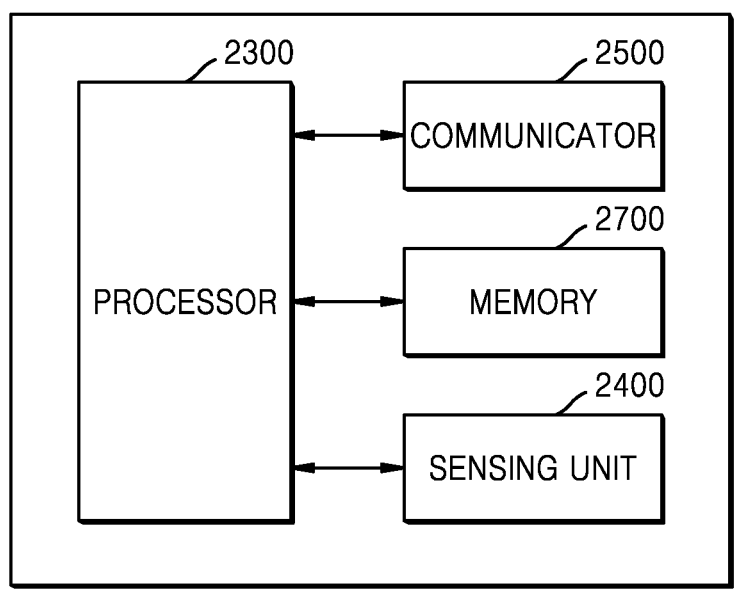
FIG. 25 is a block diagram of an electronic device according to an embodiment.

According to an embodiment of the disclosure, a communication interface such as a communicator 1500 of FIG. 24 of the mobile device 100 and a communicator 2500 of FIG. 25 of the electronic device 200 may include a Bluetooth communicator, a Bluetooth low energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra-wideband (UWB) communicator, or an Ant+ communicator, but are not limited thereto.

For example, the mobile device 100 may be paired with the electronic device 200 via Bluetooth communication and may transmit and receive data via the Bluetooth communication. In embodiments, for example, the mobile device 100 may be paired with the electronic device 200 via Wi-Fi communication and may transmit and receive data via the Wi-Fi communication.

In embodiments, for example, the mobile device 100 may be paired with the electronic device 200 via Bluetooth communication and may transmit and receive data via WFD communication, but an embodiment of the disclosure is not limited thereto.

FIG. 1 illustrates an embodiment of the disclosure and the disclosure is not limited thereto.

Hereinafter, specific embodiments of the disclosure will be described with reference to the drawings.

FIG. 2 is a diagram for describing a system including the mobile device 100 and the electronic device 200, according to an embodiment of the disclosure.

In FIG. 1, the mobile device 100 is illustrated as the smart phone 100a as an example, but is not limited thereto. According to an embodiment of the disclosure, the mobile device 100 may be the smart phone 100a or a wearable device 100b. Also, for example, the mobile device 100 may be implemented as any one of various electronic devices, such as a tablet personal computer (PC), a laptop computer, a head-mounted display (HMD), a digital camera, an electronic book terminal, a personal digital assistant (PDA), a portable multimedia player (PMP), and an MP3 player.

In FIG. 1, the TV 200a is illustrated as the electronic device 200, but an embodiment of the disclosure is not limited thereto. The electronic device 200 according to an embodiment of the disclosure may be the light bulb 200b, the laptop computer 200c, an air conditioner 200d, a washing machine 200e, or a refrigerator 200f.

According to an embodiment of the disclosure, the electronic device 200 may be a device including a display, such as the TV 200a or may be a device not including a display, such as the light bulb 200b.

Also, the electronic device 200 may be a device including a physical button for a user input, such as the laptop computer 200c, or may be a device not including a physical button, but is not limited thereto.

Examples of the electronic device 200 may include a speaker, an air cleaner, a dryer, a humidifier, a microwave oven, an audio, a digital video disk (DVD) player, a set-top box, a robot cleaner, a water purifier, a digital camera, a head-up display (HUD), a tablet PC, a PC, a smart TV, a laptop computer, a global positioning system (GPS) device, a digital broadcasting terminal, a navigation device, and other mobile or non-mobile computing devices, but are not limited thereto.

Also, the electronic device 200 may be a virtual reality (VR) device providing a VR image and having a communication function and a data processing function, an augmented reality (AR) device providing an AR image, or a wearable device such as a watch, glasses, a hairband, or a ring.

FIG. 2 illustrates an embodiment of the disclosure and the disclosure is not limited thereto.

Figure 3:
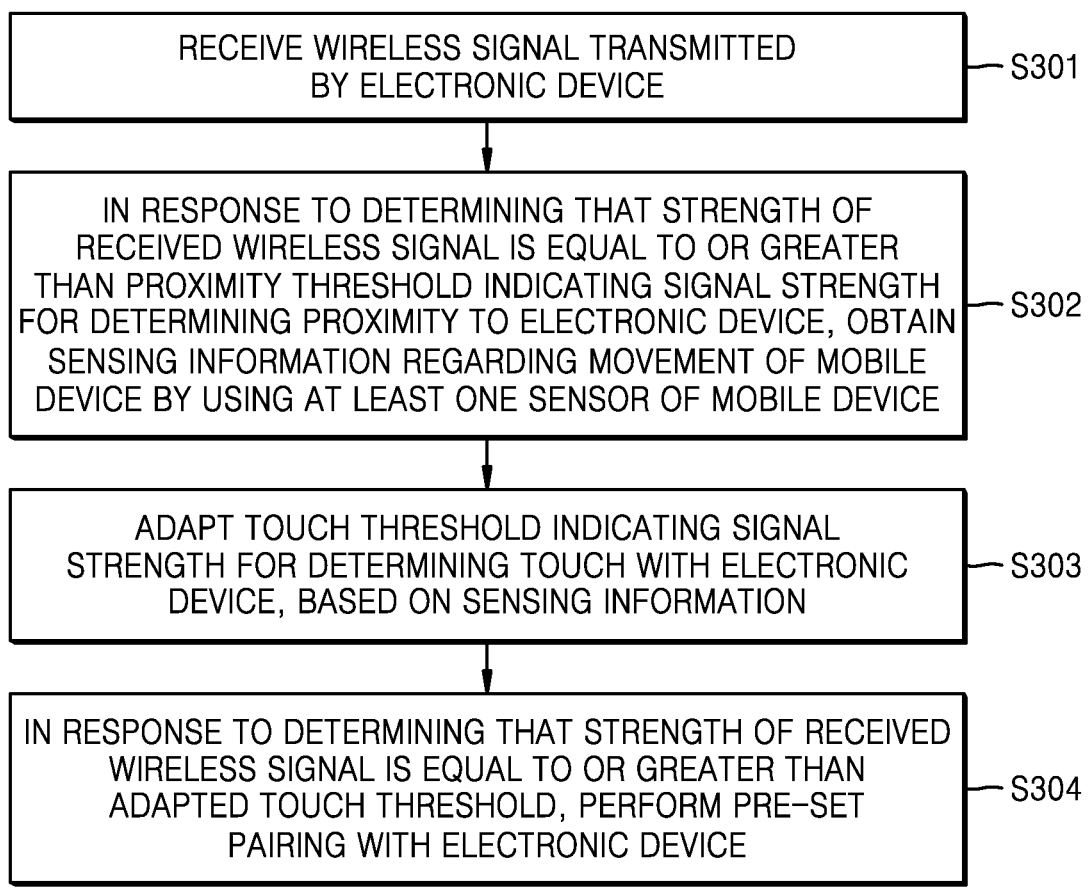
FIG. 3 is a flowchart of an operating method of a mobile device, according to an embodiment.
Figure 4:
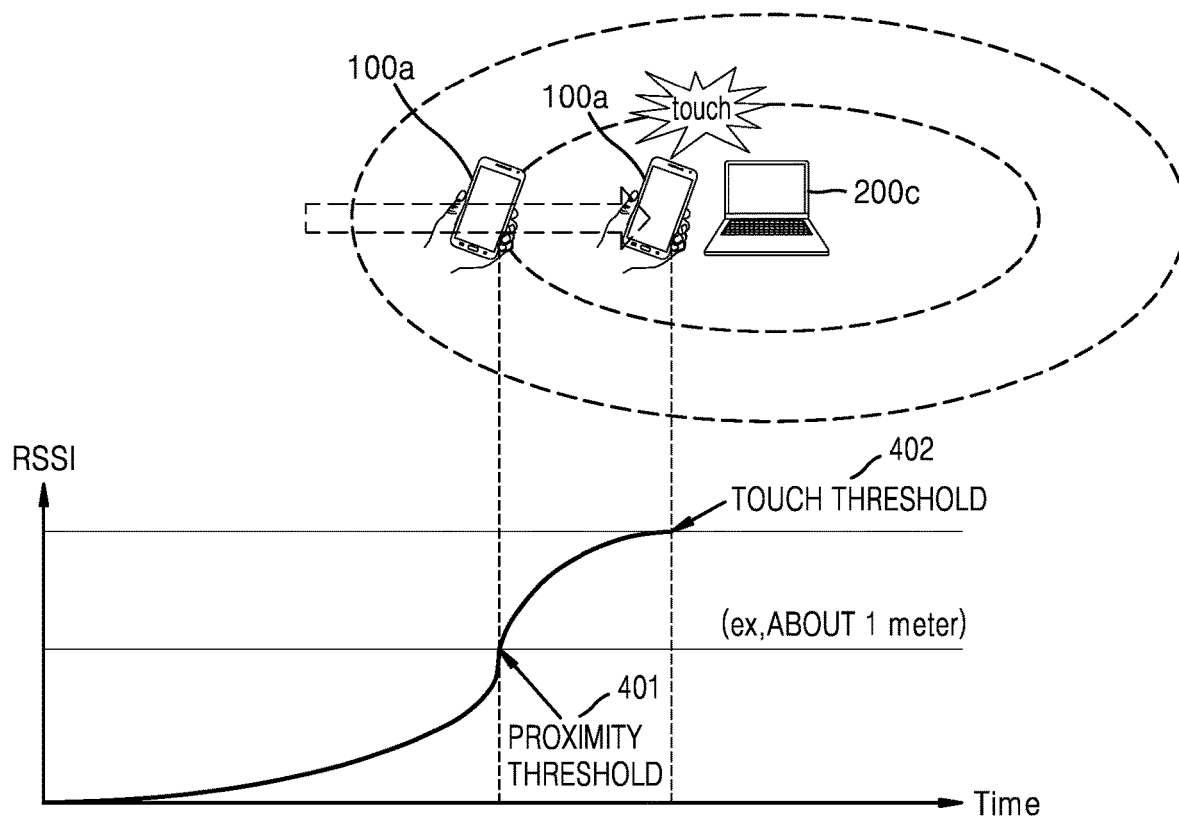
FIG. 4 is a diagram for describing a proximity threshold and a touch threshold of strength of a wireless signal received by a mobile device, according to an embodiment.
Figure 5A:
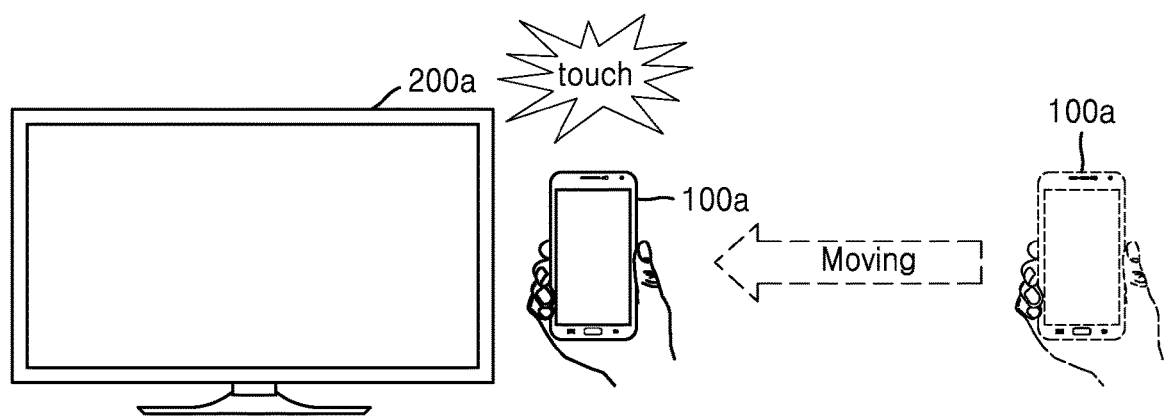
FIG. 5A is a diagram for describing an example in which a mobile device according to an embodiment obtains sensing information.
Figure 5B:
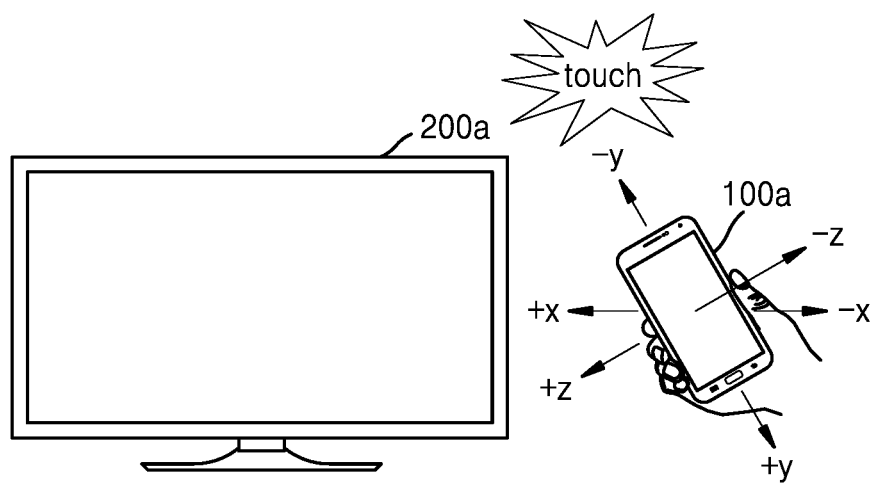
FIG. 5B is a diagram for describing another example in which a mobile device according to an embodiment obtains sensing information.
Figure 5C:
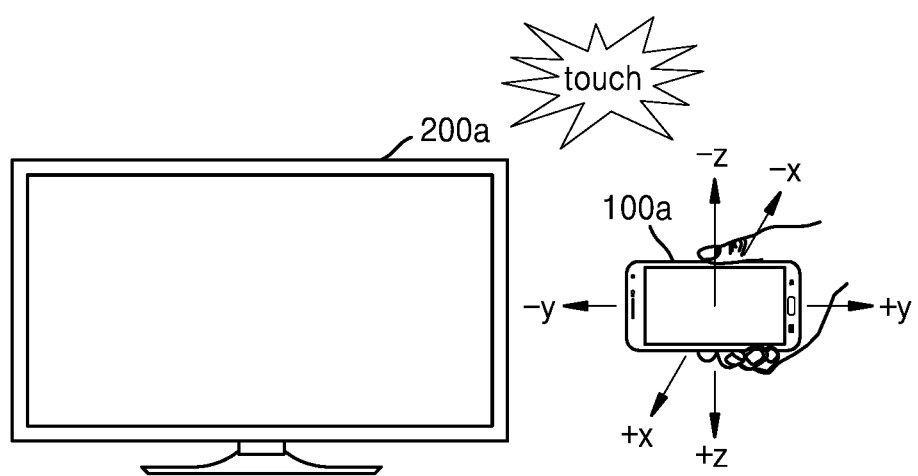
FIG. 5C is a diagram for describing another example in which a mobile device according to an embodiment obtains sensing information.
Figure 6:
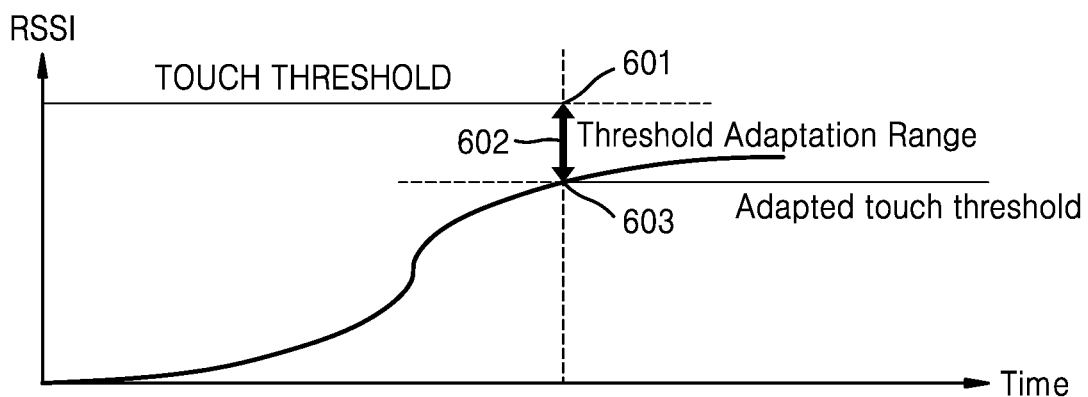
FIG. 6 is a diagram for describing an example of adapting a touch threshold, according to an embodiment.

FIG. 3 is a flowchart of an operating method of the mobile device 100, according to an embodiment of the disclosure. FIG. 4 is a diagram for describing a proximity threshold 401 and a touch threshold 402 of strength of a wireless signal received by the mobile device 100, according to an embodiment of the disclosure. FIGS. 5A through 5C are diagrams for describing examples in which the mobile device 100 according to an embodiment of the disclosure obtains sensing information. FIG. 6 is a diagram for describing an example of adapting a touch threshold, according to an embodiment of the disclosure.

The flowchart of FIG. 3 will be described with reference to FIGS. 4 through 6.

According to an embodiment of the disclosure, the mobile device 100 may adapt a touch threshold indicating a signal strength for determining a touch with the electronic device 200 to provide convenience of a use environment by controlling smooth pairing to be performed regardless of various use environments, for example, differences in an inclination, an approaching speed, acceleration, and the like of the mobile device 100 when the mobile device 100 touches the electronic device 200.

Hereinafter, examples of operations for performing pairing between the mobile device 100 and the electronic device 200 will be described in detail.

In operation S301 of FIG. 3, the mobile device 100 may receive a wireless signal transmitted by the electronic device 200.

According to an embodiment of the disclosure, the mobile device 100 may perform an operation for scanning for neighboring devices. To scan for the neighboring devices, the mobile device 100 may broadcast a wireless signal in pre-set periods. Also, the mobile device 100 may receive a wireless signal broadcasted in pre-set periods in response to the wireless signal received by the electronic device 200 that is located nearby. For example, the mobile device 100 may receive a Wi-Fi signal broadcasted in pre-set periods from the electronic device 200.

In operation S302 of FIG. 3, in response to determining that the strength of the received wireless signal is equal to or greater than a proximity threshold indicating a signal strength for determining proximity to the electronic device 200, the mobile device 100 may obtain sensing information regarding movement of the mobile device 100 by using at least one sensor of the mobile device 100.

According to an embodiment of the disclosure, the proximity threshold may denote strength of a received signal for determining that the mobile device 100 approached the electronic device 200 within a certain distance for example, 1 meter.

Referring to FIG. 4, a graph of FIG. 4 shows that strength of a received signal increases as the mobile device 100 closely approaches the electronic device 200. For example, when the smart phone 100a approaches the laptop computer 200c, strength of a received signal in the smart phone 100a gradually increases and when it is determined that the strength of the received signal is equal to or greater than a pre-set proximity threshold, it may be determined that the smart phone 100a approached the laptop computer 200c within a certain distance for example, 1 meter.

In operation S302 of FIG. 3, when it is determined that the strength of the received signal is equal to or greater than the proximity threshold, the mobile device 100 may obtain the sensing information regarding the movement of the mobile device 100 by using, for example, sensors such as a sensing unit 1400 of FIG. 24.

According to an embodiment of the disclosure, the mobile device 100 may include the sensing unit 1400 including a magnetic sensor 1410, an acceleration sensor 1420, a gyroscope sensor 1450, and the like of FIG. 24. The mobile device 100 may sense an inclination degree, a moving speed, acceleration, and the like of the mobile device 100 by using the sensing unit 1400.

For example, the mobile device 100 may obtain the sensing information about the movement while the mobile device 100 moves closely to the electronic device 200.

According to an embodiment of the disclosure, sensing information denotes information sensed via an embedded sensor as a device moves. According to an embodiment of the disclosure, the sensing information may include information about movement, inclination, and the like of the mobile device 100.

According to an embodiment of the disclosure, the information about movement may include a moving speed and acceleration of the mobile device 100.

Referring to FIG. 5A, for example, when the smart phone 100a moves closely to the TV 200a, the smart phone 100a may sense a moving speed and/or acceleration of the smart phone 100a by using the sensing unit 1400 including the acceleration sensor 1420 of FIG. 24.

Also, according to an embodiment of the disclosure, the information about the inclination may include an inclination of the mobile device 100.

Referring to FIGS. 5B and 5C, when the smart phone 100a closely touches the TV 200a, the smart phone 100a may sense an inclination of the smart phone 100a by using the sensing unit 1400 including the magnetic sensor 1410 of FIG. 24. For example, as shown in FIG. 5B, the smart phone 100a may touch the TV 200a at an inclination of 45°. In embodiments, for example, as shown in FIG. 5C, the smart phone 100a may touch the TV 200a at an inclination of 90°.

In operation S303 of FIG. 3, the mobile device 100 may adapt a touch threshold indicating a signal strength for determining a touch with the electronic device 200, based on the sensing information.

According to an embodiment of the disclosure, the touch threshold indicates strength of a received signal for determining that the mobile device 100 touched the electronic device 200.

The mobile device 100 according to an embodiment of the disclosure may adapt the touch threshold based on the sensing information regarding the movement of the mobile device 100.

According to an embodiment of the disclosure, a difference may occur in strength of a received signal sensed by the mobile device 100, depending on the inclination of the mobile device 100 when the mobile device 100 touches the electronic device 200.

For example, when an inclination of a mobile device is 0°, an RSSI loss may be 0 dB. Also, for example, when an inclination of a mobile device is 45°, an RSSI loss may be −5 dB. For example, when an inclination of a mobile device is 90°, an RSSI loss may be −10 dB.

According to an embodiment of the disclosure, the mobile device 100 may adapt the touch threshold to be low considering an RSSI loss according to the inclination of the mobile device 100.

Referring to FIG. 6, for example, when a pre-set touch threshold 601 indicating a signal strength for determining that the mobile device 100 touched the electronic device 200 is −10 dBm, the mobile device 100 may adapt the touch threshold by a certain range, i.e., a threshold adaptation range 602, to determine the touch with the electronic device 200 based on an adapted touch threshold 603 for example, −20 dBm.

Also, when it is determined that the moving speed of the mobile device 100 is equal to or greater than a pre-set value, the mobile device 100 according to an embodiment of the disclosure may determine that the mobile device 100 is moving towards the electronic device 200 with a touch intention for pairing and lower the touch threshold for determining the touch with the electronic device 200.

According to an embodiment of the disclosure, by lowering the touch threshold, the mobile device 100 may determine the touch intention for pairing and perform the pairing, based on an error range in various use environments, thereby improving use convenience.

In operation S304 of FIG. 3, in response to determining that the strength of the received wireless signal is equal to or greater than the adapted touch threshold, the mobile device 100 may perform pre-set pairing with the electronic device 200.

According to an embodiment of the disclosure, the mobile device 100 may calculate the strength of the received wireless signal in pre-set periods while moving closely to the electronic device 200. When it is determined that the calculated strength of the wireless signal is equal to or greater than the touch threshold adapted in operation S303, the mobile device 100 may determine that the mobile device 100 touched the electronic device 200.

According to an embodiment of the disclosure, in response to determining the touch with the electronic device 200, the mobile device 100 may perform the pre-set pairing with the electronic device 200.

For example, in response to determining the touch with the electronic device 200, the mobile device 100 may be paired with the electronic device 200 via a WFD communication connection using a WFD communicator.

In embodiments, for example, the mobile device 100 may be paired with the electronic device 200 via a Bluetooth communication connection.

According to an embodiment of the disclosure, the mobile device 100 and the electronic device 200 may be paired to execute an application for providing a pre-determined service. For example, the mobile device 100 and the electronic device 200 may execute an application for screen mirroring such that output data being displayed on a screen of the mobile device 100 is shared with the electronic device 200.

FIGS. 3 through 6 are diagrams for describing an embodiment of the disclosure and thus do not limit the disclosure.

Figure 7:
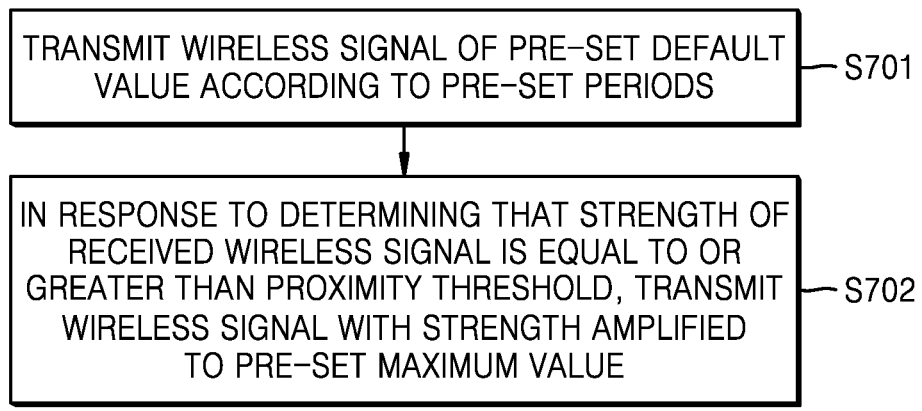
FIG. 7 is a flowchart of an example by which a mobile device transmits a wireless signal with a signal strength of a pre-set maximum value, according to an embodiment.

FIG. 7 is a flowchart of an example by which the mobile device 100 transmits a wireless signal with a signal strength of a pre-set maximum value, according to an embodiment of the disclosure.

In operation S701, the mobile device 100 may transmit a wireless signal with strength of a pre-set default value according to pre-set periods.

For example, when a temporal interval, for example an advertising interval, between signals is set to 100 ms, the mobile device 100 may emit a signal with strength of pre-set transmit power (Tx power) at intervals of 100 ms.

Also, according to an embodiment of the disclosure, the mobile device 100 may receive, from the electronic device 200, a signal broadcasted in strength of a pre-set default value according to pre-set periods.

In operation S702, in response to determining that the strength of a received wireless signal is equal to or greater than a proximity threshold, the mobile device 100 may emit a wireless signal in strength amplified to a pre-set maximum value.

According to an embodiment of the disclosure, when it is determined that strength of a received signal gradually increases and becomes equal to or greater than the pre-set proximity threshold as the mobile device 100 approaches the electronic device 200, the mobile device 100 may determine a proximity state, for example, a distance of 1 m, with the electronic device 200. When it is determined that the strength of the received signal is equal to or greater than the pre-set proximity threshold, the mobile device 100 may raise Tx power of an output signal to the pre-set maximum value.

Also, according to an embodiment of the disclosure, upon receiving a wireless signal having rapidly increased strength, the electronic device 200 may raise the Tx power of the output signal to the pre-set maximum value.

Accordingly, the mobile device 100 receives the wireless signal having the rapidly increased strength. According to an embodiment of the disclosure, an RSSI value measured after the mobile device 100 determines that the strength of the received wireless signal is equal to or greater than the proximity threshold may rapidly increase.

For example, the strength of the signal received by the mobile device 100, for example the RSSI value, may increase, for example, from −70 dBm to −10 dBm, as the mobile device 100 moves close to the electronic device 200.

According to an embodiment of the disclosure, the mobile device 100 may identify whether an external device that emitted a signal is an external attacker, based on the strength of the received signal.

According to an embodiment of the disclosure, in response to the strength of the received signal being measured close to the pre-set maximum value, the mobile device 100 may identify the device that emitted the signal to be a device with a touch intention for pairing with the mobile device 100 instead of an external attacker and perform pairing. This is because it is not easy for the external attacker to imitate a legitimate device by emitting a signal with strength amplified by a certain value or higher.

For example, when the strength of the signal received by the mobile device 100 is measured to be increased, for example, to −10 dBm from −70 dBm, a range of signal strength is about 60 dB. Such a range (about 60 dB) of a difference in signal strengths may be difficult to be generated by a signal amplification attack of the external attacker.

According to an embodiment of the disclosure, the mobile device 100 and the electronic device 200 expand ranges of strength of received signals therebetween by amplifying strength of signals to a pre-set maximum value and emitting the signals, thereby increasing pairing safety between device having true pairing intentions and reinforcing security from the external attacker.

Hereinafter, examples of operations of the mobile device 100 and the electronic device 200 transmitting and receiving wireless signals of strength amplified to a pre-set maximum value will be described in detail with reference to FIG. 8.

Figure 8:
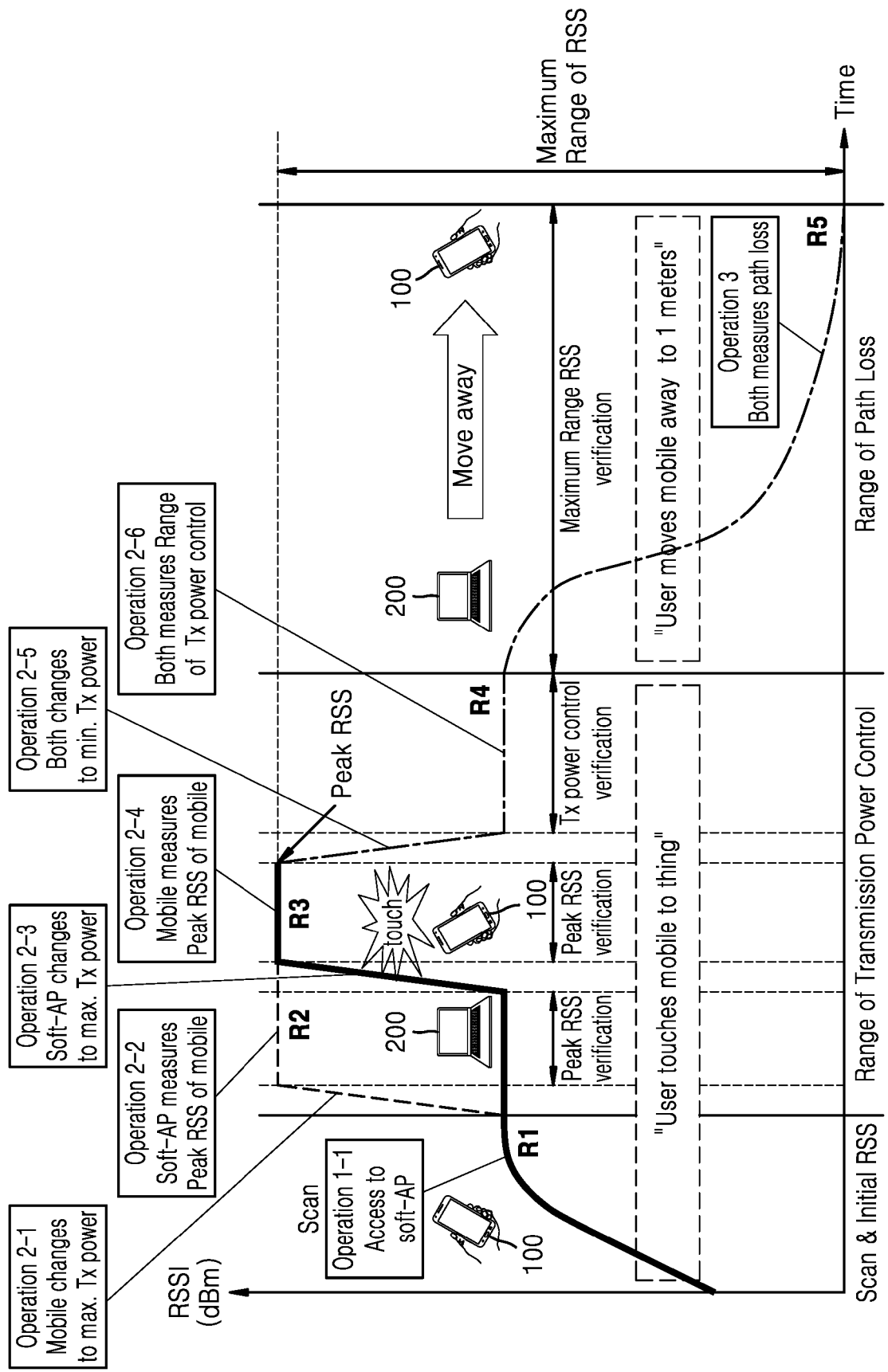
FIG. 8 is a diagram for describing an example by which a mobile device transmits and receives a wireless signal with a signal strength of a pre-set maximum value, according to an embodiment.

FIG. 8 is a diagram for describing an example by which the mobile device 100 transmits and receives a wireless signal with a signal strength of a pre-set maximum value, according to an embodiment of the disclosure.

A graph of FIG. 8 indicates strength of a received signal while the mobile device 100 closely approaches and touches the electronic device 200 and then is separated from the electronic device 200.

In operation 1-1 of FIG. 8, the mobile device 100 may scan a neighboring device, for example the electronic device 200, while approaching the electronic device 200. The electronic device 200 may be a device including a software AP.

A region R1 of the graph indicates strength of a received signal when the mobile device 100 scans the neighboring device (the electronic device 200) while closely approaching the electronic device 200. The strength of the received signal may increase when the mobile device 100 approaches the software AP of the electronic device 200.

In operation 2-1, the mobile device 100 may transmit an output signal in strength (Tx power) amplified to a pre-set maximum value. For example, operation 2-1 may be performed when the mobile device 100 approached the electronic device 200 by a certain distance for example, 1 m. Accordingly, in operation 2-2, the electronic device 200 may measure the strength of the received signal with a rapidly increased value.

A region R2 of the graph indicates maximum strength of the reception signal (peak RSS) measured by the electronic device 200 when the mobile device 100 transmits the signal with strength (Tx power) amplified to the pre-set maximum value in response to determining that the strength of the signal received from the electronic device 200 is equal to or greater than a proximity threshold.

In operation 2-3, the electronic device 200 may transmit an output signal with strength (Tx power) amplified to the pre-set maximum value. According to an embodiment of the disclosure, in response to sensing the strength of the received signal as the rapidly increased maximum strength (peak RSS) of the received signal, the electronic device 200 may transmit the output signal with the strength (Tx power) amplified to the pre-set maximum value.

Accordingly, in operation 2-4, the mobile device 100 may measure the strength of the received signal with a rapidly increased value.

A region R3 of the graph indicates the maximum strength of the received signal (peak RSS) measured by the mobile device 100 when the electronic device 200 transmits a signal with strength (Tx power) amplified to the pre-set maximum value.

Also, according to an embodiment of the disclosure, when the strength of the received signal is sensed to be the pre-set maximum value (peak RSS), the mobile device 100 may re-set the strength (Tx power) of the output signal to strength of a pre-set default value and transmit a wireless signal with strength in a default value.

In operation 2-5, the mobile device 100 and the electronic device 200 may adapt Tx power to the strength of the pre-set default value and transmit a wireless signal in an adapted signal strength. Accordingly, in operation 2-6, the mobile device 100 and the electronic device 200 may measure the strength of the received signal in a reduced value.

A region R4 of the graph indicates the reduced strength of the received signal measured by the mobile device 100 and the electronic device 200. In the region R4, because the mobile device 100 and the electronic device 200 transmit the output signals having a strength (Tx power) of the pre-set default value, the strength of the received signals in the mobile device 100 and the electronic device 200 have a rapidly reduced value.

According to an embodiment of the disclosure, a user may touch the mobile device 100 to the electronic device 200 to pair the mobile device 100 to the electronic device 200 and then the user holding the mobile device 100 may move away from the electronic device 200, and thus the mobile device 100 may be separated from the electronic device 200 by a certain distance or more.

As the mobile device 100 is separated farther from the electronic device 200, the strength of the received signal in the mobile device 100 and the strength of the received signal in the electronic device 200 may be sensed by gradually decreased values.

In operation 3, when the mobile device 100 is separated from the electronic device 200, the mobile device 100 and the electronic device 200 may measure a signal strength to which a path loss is reflected. A region R5 of the graph indicates the strength of the received signal to which the path loss is reflected, as the strength of the received signal measured by the mobile device 100 and the electronic device 200.

A space between the mobile device 100 and the electronic device 200 may be a free space in the air and a path loss may occur in the space. The path loss is a loss of an electromagnetic wave signal occurred during communication in the free space. In the free space, the path loss may tend to rapidly decrease as a distance between two devices is decreased and may tend to increase as the distance between the two devices is increased.

Figure 9:
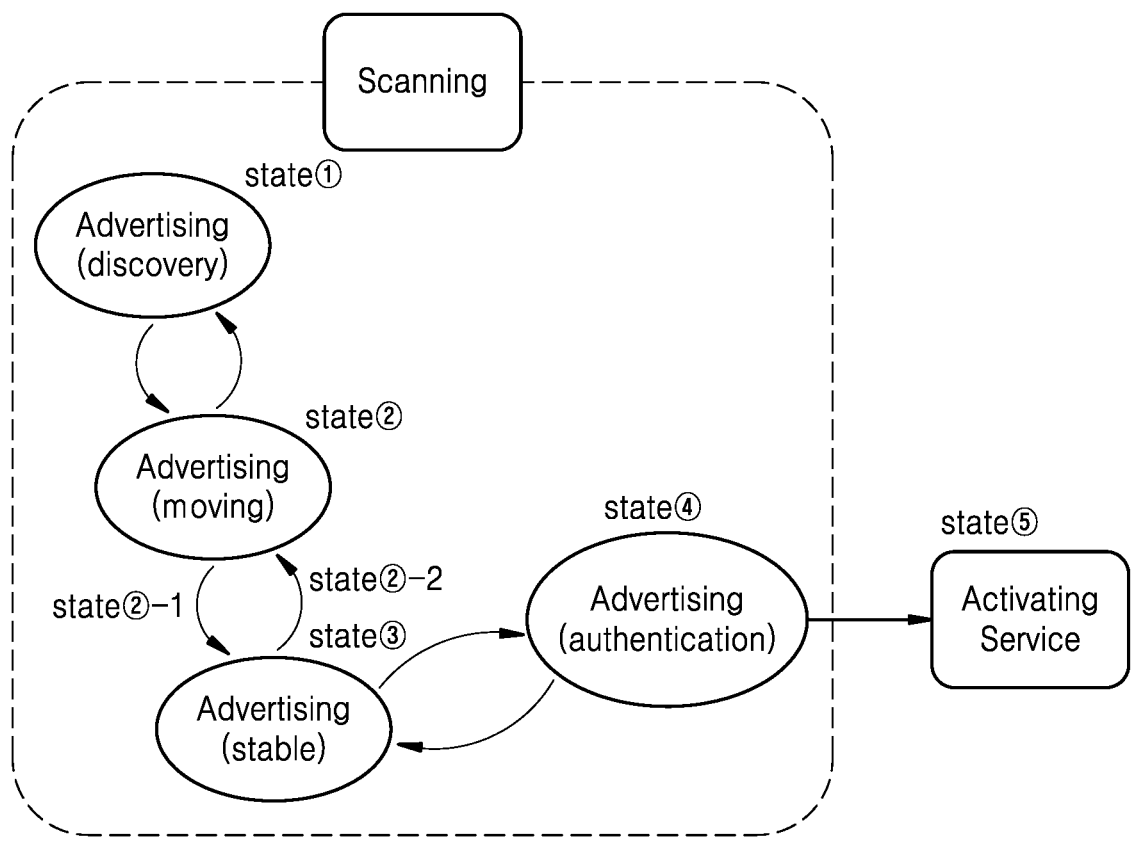
FIG. 9 is a diagram for describing an example of changes in the state of a mobile device while the mobile device performs pairing with an electronic device, according to an embodiment.

FIG. 9 is a diagram for describing an example of changes in the state of the mobile device 100 while the mobile device 100 performs pairing with the electronic device 200, according to an embodiment of the disclosure. According to an embodiment of the disclosure, the mobile device 100 may scan a neighboring device, for example the electronic device 200, to perform pairing.

According to an embodiment of the disclosure, to scan the electronic device 200, the mobile device 100 may broadcast an advertising packet in a state ①. Here, the advertising packet may include information indicating that the neighboring device is being searched for as device state information.

According to an embodiment of the disclosure, when the mobile device 100 is in a state of approaching the electronic device 200 for example, a distance of 1 m, the broadcasted advertising packet may include information indicating moving as the device state information in state ②.

According to an embodiment of the disclosure, when the mobile device 100 touches the electronic device 200, for example after the transition of state ②-1, the broadcasted advertising packet may include information indicating a stable state as a touch state in state ③.

Also, according to an embodiment of the disclosure, when the mobile device 100 is separated from the electronic device 200, for example after the transition of state ②-2, the broadcasted advertising packet may include information indicating moving as the device state information in state ②.

According to an embodiment of the disclosure, the mobile device 100 may exchange authentication information with the electronic device 200 by broadcasting the authentication information in the advertising packet in state ④. According to an embodiment of the disclosure, upon completing authentication by transmitting and receiving the authentication information to and from the electronic device 200, the mobile device 100 may perform pairing with the electronic device 200.

According to an embodiment of the disclosure, upon pairing with the electronic device 200, the mobile device 100 may activate a certain service, for example, screen mirroring, in state ⑤.

Figure 10:
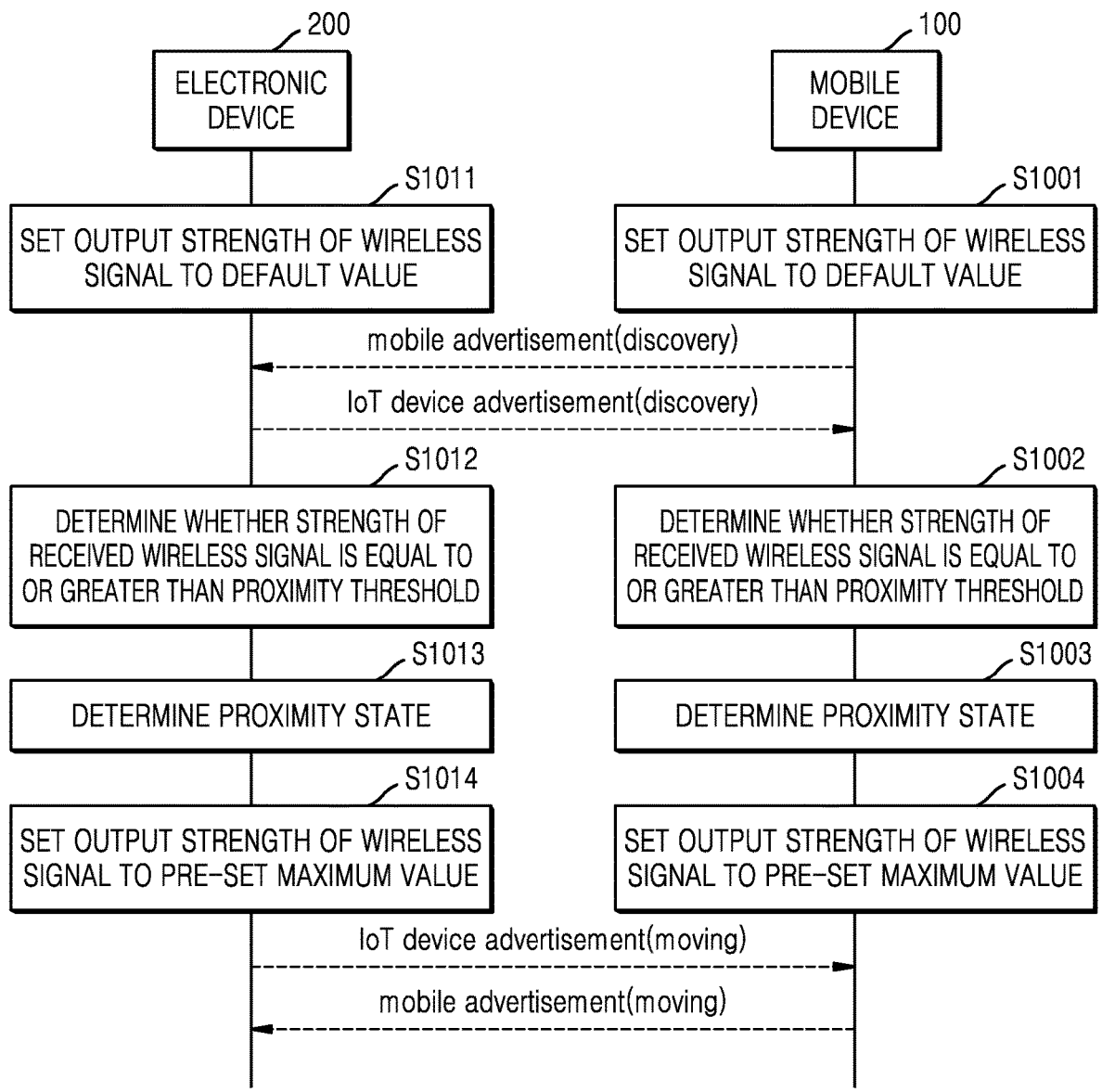
FIG. 10 is a flowchart of operations of a mobile device and an electronic device while the mobile device approaches the electronic device, according to an embodiment.

FIG. 10 is a flowchart of operations of the mobile device 100 and the electronic device 200 while the mobile device 100 approaches the electronic device 200, according to an embodiment of the disclosure.

According to an embodiment of the disclosure, the mobile device 100 and the electronic device 200 may transmit and receive an advertising packet to scan a neighboring device via Bluetooth communication. The advertising packet may include device state information, device address information, a Tx power level, and the like.

According to an embodiment of the disclosure, the mobile device 100 and the electronic device 200 may broadcast the advertising packet including current device state information, according to pre-set periods.

In operation S1001, the mobile device 100 may set output strength of a wireless signal to a default value. Also, in operation S1011, the electronic device 200 may set output strength of a wireless signal to a default value.

According to an embodiment of the disclosure, the mobile device 100 and the electronic device 200 may set a Tx power level to a pre-set default value.

According to an embodiment of the disclosure, the mobile device 100 and the electronic device 200 may broadcast the advertising packet. Here, the advertising packet may include information indicating that a neighboring device is being searched for, or that the electronic device 200 is in a discovery mode, as device state information.

In operation S1002, the mobile device 100 may determine whether strength of a received wireless signal is equal to or greater than a proximity threshold. In operation S1003, the mobile device 100 may determine a proximity state with the electronic device 200.

For example, in response to determining that the strength of the wireless signal received from the electronic device 200 is equal to or greater than a pre-set proximity threshold, the mobile device 100 may determine to be in the proximity to the electronic device 200 within a certain distance, for example, 1 m. In operation S1012, the electronic device 200 may determine whether strength of a received wireless signal is equal to or greater than a proximity threshold. In operation S1013, the electronic device 200 may determine a proximity state with the mobile device 100.

For example, in response to determining that the strength of the wireless signal received from the mobile device 100 is equal to or greater than a pre-set proximity threshold, the electronic device 200 may determine to be in the proximity to the mobile device 100 within a certain distance, for example, 1 m.

In operation S1004, the mobile device 100 may set the output strength of the wireless signal to a pre-set maximum value. According to an embodiment of the disclosure, in response to determining that the strength of the received wireless signal is equal to or greater than the proximity threshold, the mobile device 100 may set Tx power to a pre-set maximum value.

Also, in operation S1014, the electronic device 200 may set the output strength of the wireless signal to a pre-set maximum value. According to an embodiment of the disclosure, in response to determining that the strength of the received wireless signal is equal to or greater than the proximity threshold, the electronic device 200 may set Tx power to a pre-set maximum value.

According to an embodiment of the disclosure, the mobile device 100 and the electronic device 200 may broadcast the advertising packet according to pre-set periods. Here, the advertising packet may include information indicating a moving mode as the device state information.

Figure 11:
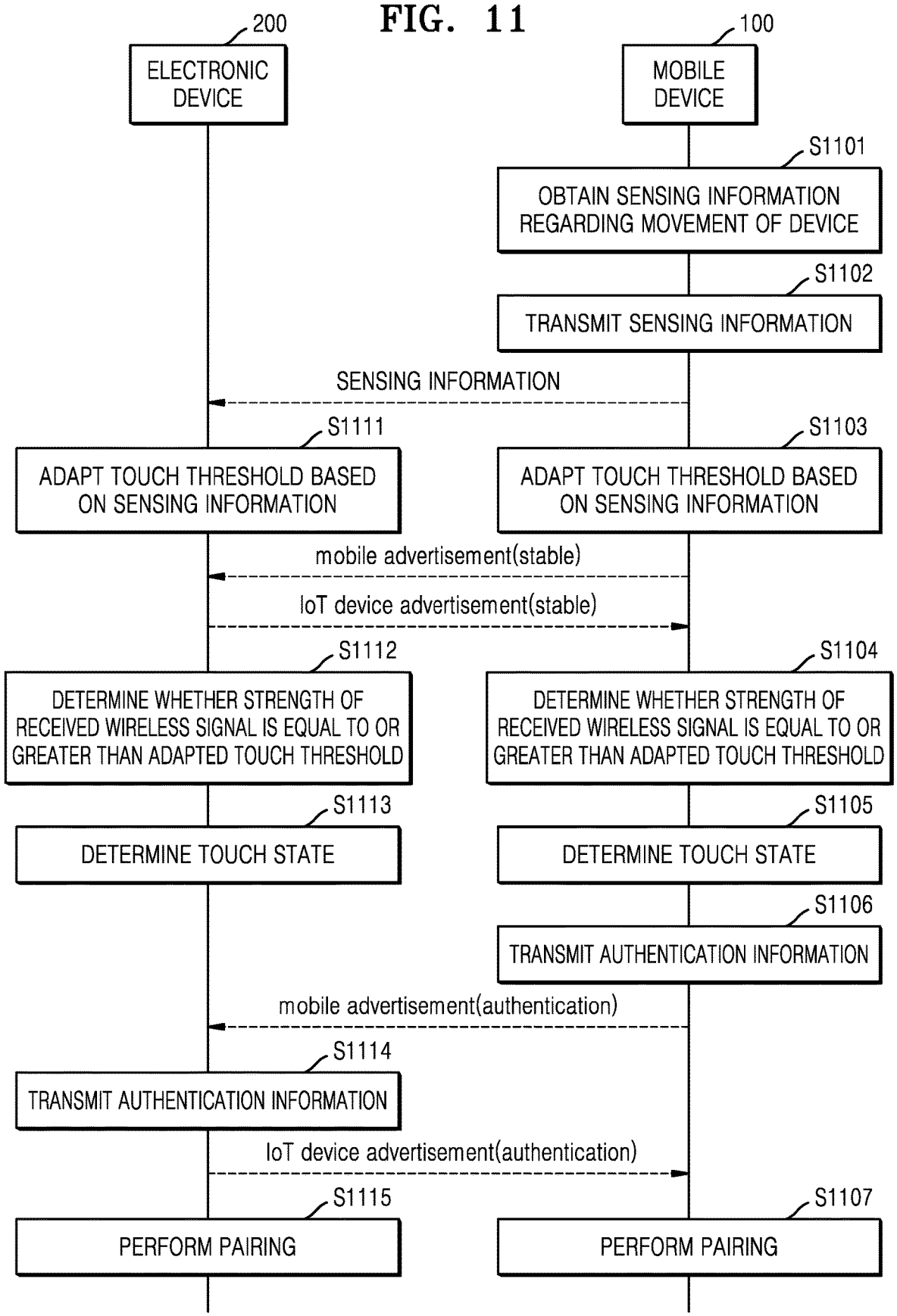
FIG. 11 is a flowchart of operations for adapting a touch threshold and exchanging authentication information, according to an embodiment.

FIG. 11 is a flowchart of operations for adapting a touch threshold and exchanging authentication information, according to an embodiment of the disclosure.

In operation S1101, the mobile device 100 may obtain sensing information regarding movement of a device.

According to an embodiment of the disclosure, the mobile device 100 may obtain information about movement and/or inclination of the mobile device 100 by using, for example, the sensing unit 1400 of FIG. 24.

According to an embodiment of the disclosure, the mobile device 100 may adapt a touch threshold based on the information about the movement and/or the inclination of the mobile device 100.

For example, the touch threshold indicating strength of a received signal for determining that the mobile device 100 touched the electronic device 200 may be lowered in consideration of signal attenuation or the like caused by a difference in an inclination degree or moving speed when a user touches the mobile device 100 to the electronic device 200.

Also, in operation S1102, the mobile device 100 may transmit the sensing information.

According to an embodiment of the disclosure, the mobile device 100 may transmit the sensing information regarding movement of the mobile device 100 to the electronic device 200. In operation S1111, according to an embodiment of the disclosure, upon receiving the sensing information, the electronic device 200 may adapt the touch threshold based on the sensing information of the mobile device 100.

According to an embodiment of the disclosure, the electronic device 200 may lower a pre-set touch threshold in consideration of attenuation of a received signal or the like caused by the movement of the mobile device 100.

According to an embodiment of the disclosure, the mobile device 100 and the electronic device 200 may transmit an advertising packet according to pre-set periods. Here, the advertising packet may include, as device state information, information indicating that the mobile device 100 and the electronic device 200 are touching or in a stable state close enough to touch each other.

In operation S1104, the mobile device 100 may determine whether strength of a received wireless signal is equal to or greater than the adapted touch threshold. Accordingly, in operation S1105, the mobile device 100 may determine a touch state with the electronic device 200.

Also, in operation S1112, the electronic device 200 may determine whether strength of a received wireless signal is equal to or greater than the adapted touch threshold. Accordingly, in operation S1113, the electronic device 200 may determine a touch state with the mobile device 100.

In operation S1106, the mobile device 100 may transmit authentication information.

Also, in operation S1114, the electronic device 200 may transmit authentication information.

According to an embodiment of the disclosure, the mobile device 100 and the electronic device 200 may transmit the advertising packet according to pre-set periods. Here, the advertising packet may include the authentication information. The mobile device 100 and the electronic device 200 may exchange the authentication information by transmitting and receiving the advertising packets including the authentication information.

According to an embodiment of the disclosure, the mobile device 100 and the electronic device 200 may set security between the mobile device 100 and the electronic device 200 via a specific authentication procedure, such as by using a public key encryption method.

Also, for example, the mobile device 100 may transmit a message authentication code including a hash value (for example, MACmobile=hashsk (IDmobile, IDtv, nonce, TagStatus)) generated by processing a shared key (sk). Also, the electronic device 200 may transmit a message authentication code including a hash value (for example, MACTV=hashsk (IDtv, nonce, TagStatus)) generated by processing a shared key (sk).

According to an embodiment of the disclosure, the mobile device 100 may authenticate the electronic device 200 in response to determining that the electronic device 200 has a same shared key by using the hash value included in the received message authentication code.

In operations S1107 and S1115, the mobile device 100 and the electronic device 200 may perform pairing.

According to an embodiment of the disclosure, the mobile device 100 and the electronic device 200 may perform the pairing upon completing the specific authentication procedure.

Also, according to an embodiment of the disclosure, the electronic device 200 paired with the mobile device 100 may activate an application for providing a certain service, for example, screen mirroring.

Figure 12:
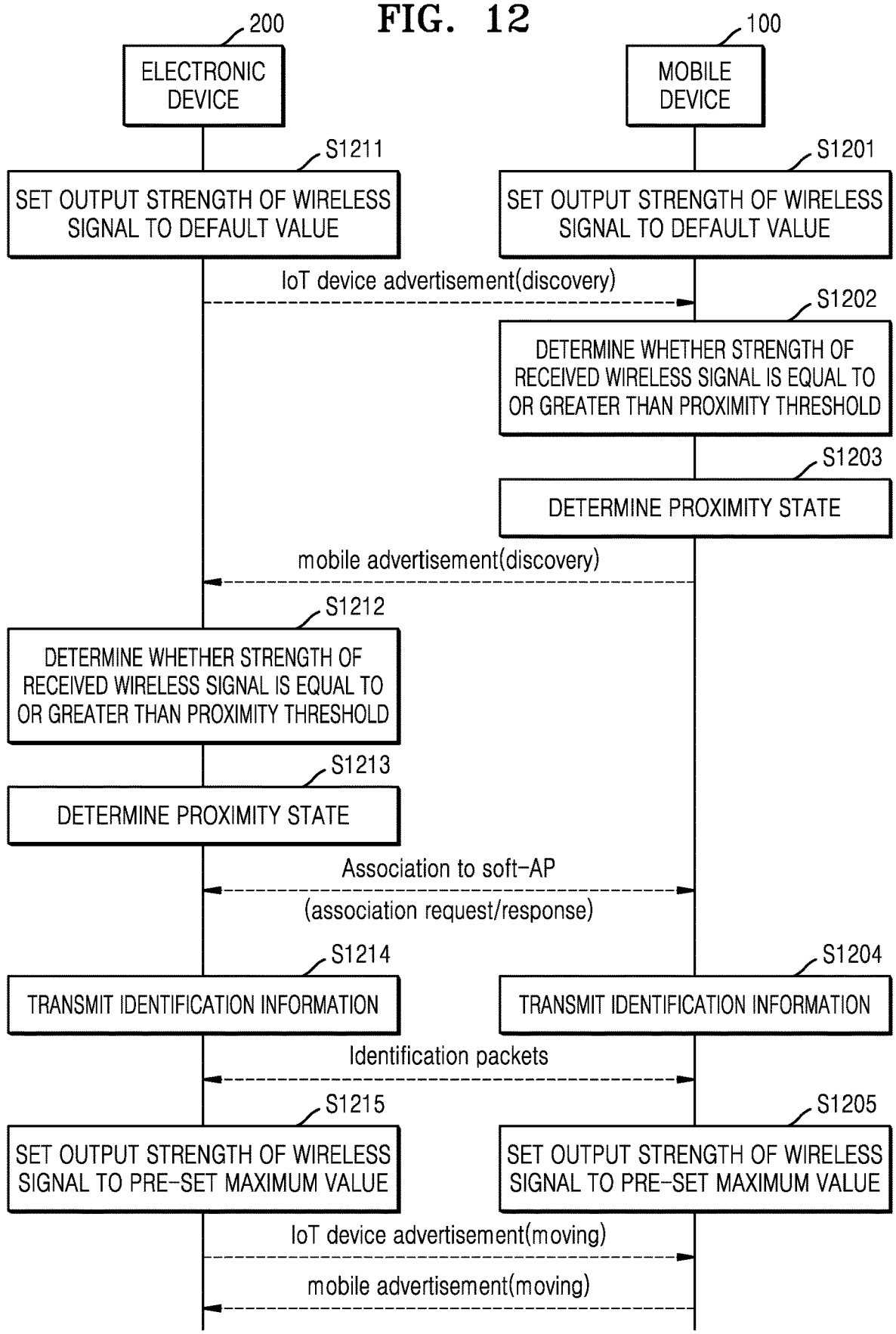
FIG. 12 is a flowchart of operations of an electronic device and a mobile device for exchanging identification information, according to an embodiment.

FIG. 12 is a flowchart of operations of the electronic device 200 and the mobile device 100 for exchanging identification information, according to an embodiment of the disclosure.

Descriptions of operations S1201, S1202, S1203, S1205, S1211, S1212, S1213, and S1215, which overlap those of FIG. 10 are omitted.

In operation S1201, the mobile device 100 may set output strength of a wireless signal to a default value.

Also, in operation S1211, the electronic device 200 may set output strength of a wireless signal to a default value.

According to an embodiment of the disclosure, the mobile device 100 and the electronic device 200 may transmit the advertising packet according to pre-set periods. Here, the advertising packet may include information indicating that a neighboring device is being searched for, or that the electronic device 200 is in a discovery mode, as device state information. In operation S1202, the mobile device 100 may determine whether strength of a received wireless signal is equal to or greater than a proximity threshold. Accordingly, in operation S1203, the mobile device 100 may determine a proximity state.

In operation S1212, the electronic device 200 may determine whether strength of a received wireless signal is equal to or greater than a proximity threshold. In operation S1213, the electronic device 200 may determine a proximity state.

According to an embodiment of the disclosure, the mobile device 100 and the electronic device 200 may exchange identification information when performing initial pairing.

For example, the mobile device 100 may transmit an association request message to the electronic device 200 performing a software AP function and receive a response message, by using Wi-Fi communication.

In operation S1204 and S1214, the mobile device 100 and the electronic device 200 may transmit identification information.

For example, the mobile device 100 and the electronic device 200 may transmit and receive identification packets including identification information of a device.

For example, the mobile device 100 may transmit a Wi-Fi data frame ('Payload=Mobile Name, Model code, Tx Power') including the identification information. Also, the mobile device 100 may receive a Wi-Fi data frame ('Payload=Device Name, Model code, Tx Power') from the electronic device 200.

In operation S1205, the mobile device 100 may set the output strength of the wireless signal to a pre-set maximum value. According to an embodiment of the disclosure, in response to determining that strength of a received signal is equal to or greater than the proximity threshold, the mobile device 100 may raise an output signal strength (Tx power) to a pre-set maximum value.

Also, in operation S1215, the electronic device 200 may set the output strength of the wireless signal to a pre-set maximum value. According to an embodiment of the disclosure, in response to determining that strength of a received signal is equal to or greater than the proximity threshold, the electronic device 200 may raise an output signal strength (Tx power) to a pre-set maximum value.

According to an embodiment of the disclosure, the mobile device 100 and the electronic device 200 may transmit an advertising packet according to pre-set periods. Here, the advertising packet may include information indicating moving as device state information.

Figure 13:
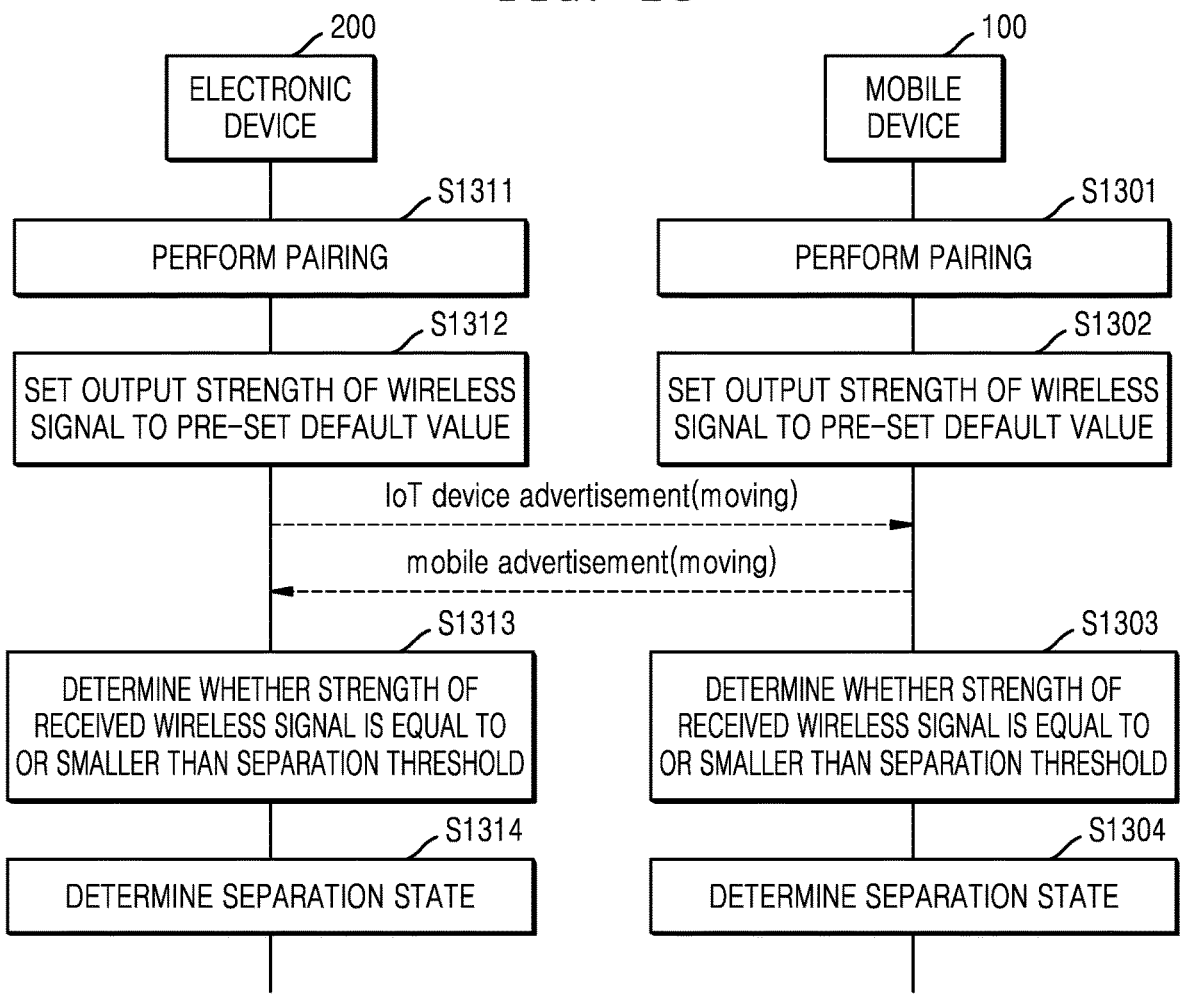
FIG. 13 is a flowchart of operations of a mobile device and electronic device while the mobile device is separated from the electronic device, according to an embodiment.

FIG. 13 is a flowchart of operations of the mobile device 100 and the electronic device 200 while the mobile device 100 is separated from the electronic device 200, according to an embodiment of the disclosure.

According to an embodiment of the disclosure, the mobile device 100 and the electronic device 200 may raise an output signal strength to a pre-set maximum value when strength of a received signal is determined to be equal to or greater than a proximity threshold. According to an embodiment of the disclosure, a touch between devices having true pairing intentions may be identified by expanding a range of strength of a received signal measured while the mobile device 100 and the electronic device 200 approach each other.

In operations S1301 and S1311, the mobile device 100 and the electronic device 200 may perform pairing.

According to an embodiment of the disclosure, the mobile device 100 and the electronic device 200 may adapt an output signal strength to a pre-set default value after being paired.

In operation S1302, the mobile device 100 may set output strength of a wireless signal to a pre-set default value. In operation S1312, the electronic device 200 may set output strength of a wireless signal to a pre-set default value.

According to an embodiment of the disclosure, the mobile device 100 and the electronic device 200 may transmit an advertising packet according to pre-set periods. Here, the advertising packet may include, as device state information, information indicating that the mobile device 100 and the electronic device 200 are moving.

In operation S1303, the mobile device 100 may determine whether strength of a received wireless signal is equal to or smaller than a separation threshold. Accordingly, in operation S1304, the mobile device 100 may determine a separation state.

Also, in operation S1313, the electronic device 200 may determine whether strength of a received wireless signal is equal to or smaller than a separation threshold. Accordingly, in operation S1314, the electronic device 200 may determine a separation state.

According to an embodiment of the disclosure, the separation threshold indicates strength of a received signal for determining that the mobile device 100 and the electronic device 200 are separated by at least a certain distance.

FIG. 14 is a flowchart of an example of adapting a touch threshold based on identification information of the electronic device 200, according to an embodiment of the disclosure. FIG. 15 is a table for describing an example of adapting a touch threshold based on identification information of the electronic device 200, according to an embodiment of the disclosure.

The flowchart of FIG. 14 will be described with reference to FIG. 15.

According to an embodiment of the disclosure, the mobile device 100 may adapt a touch threshold for determining a touch with the electronic device 200, based on identification information of the electronic device 200.

According to an embodiment of the disclosure, identification information of an electronic device may be information for identifying the electronic device and may be set during manufacture of the electronic device. For example, the identification information of the electronic device may include a model name, a product number, or the like of the electronic device.

In operation S1401 of FIG. 14, the mobile device 100 may obtain identification information for identifying the electronic device 200, from the electronic device 200.

For example, the mobile device 100 may obtain the identification information for identifying the electronic device 200 from a beacon included in a Wi-Fi signal broadcasted by the electronic device 200.

In operation S1402, the mobile device 100 may extract, from a memory, a pre-set adaptation standard for adapting a touch threshold, based on the identification information of the electronic device 200.

According to an embodiment of the disclosure, as shown in FIG. 15, the adaptation standard of the touch threshold corresponding to the identification information of the electronic device 200 may be pre-stored in the memory of the mobile device 100.

According to an embodiment of the disclosure, a hardware specification unique to an electronic device may be identified based on identification information of the electronic device. Strength of a sensed wireless signal may vary depending on a hardware specification of each device, for example, a chipset specification or an antenna gain value of the device.

According to an embodiment of the disclosure, the adaptation standard of the touch threshold may be differently set depending on attributes of the mobile device 100. For example, the adaptation standard of the touch threshold for determining a touch with the electronic device 200 may be set depending on a hardware specification of the mobile device 100, for example, a chipset specification, an antenna gain value, or the like.

According to an embodiment of the disclosure, the mobile device 100 may update the adaptation standard for adapting the touch threshold by learning a history of touching another device.

In operation S1403, the mobile device 100 may identify, from the extracted adaptation standard, adaptation information of the touch threshold corresponding to movement of the mobile device 100. In operation S1404, the mobile device 100 may adapt the touch threshold which is a strength of a received signal for determining a touch with the electronic device 200, according to the identified adaptation information.

According to an embodiment of the disclosure, the mobile device 100 may determine an adaptation degree of the touch threshold according to the identification information of the electronic device 200 and the movement of the mobile device 100, for example, a pre-set adaptation standard corresponding to inclination of the mobile device 100.

Referring to FIG. 15, an adaptation value 1503 of a touch threshold may be determined based on an inclination 1502 of the mobile device 100, for each model name 1501 of the electronic device 200.

For example, when the electronic device 200 is a first model, for example, 1xxxyz23, and an inclination of the mobile device 100 tagged to the electronic device 200 is 0°, a touch threshold may be adapted to −10 dBm. Also, for example, when the electronic device 200 is a second model, for example, 2xxyzz32, and an inclination of the mobile device 100 tagged to the electronic device 200 is 45°, a touch threshold may be adapted to −30 dBm.

According to an embodiment of the disclosure, the mobile device 100 may determine a touch with the electronic device 200 based on the adapted touch threshold.

FIGS. 14 and 15 are diagrams for describing an embodiment of the disclosure and thus do not limit the disclosure.

Figures 16, 17:
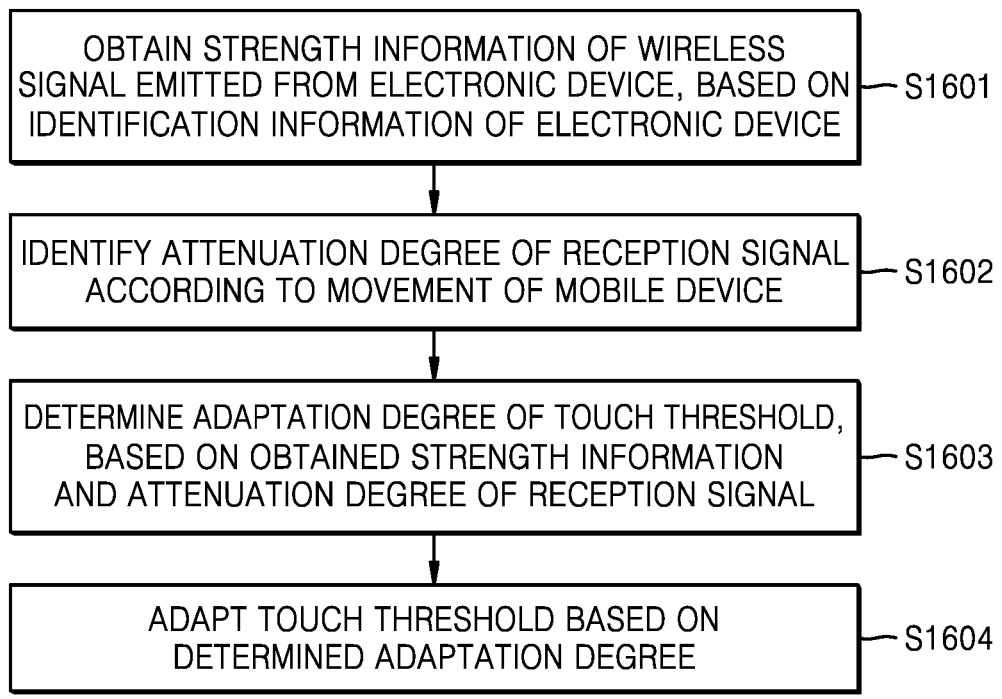
FIG. 16 is a flowchart of an example of adapting a touch threshold based on an attenuation degree of a received signal according to movement of a mobile device, according to an embodiment.
FIG. 17 is a table for describing an example of adapting a touch threshold based on an attenuation degree of a received signal according to movement of a mobile device, according to an embodiment.
Figures 18, 19:
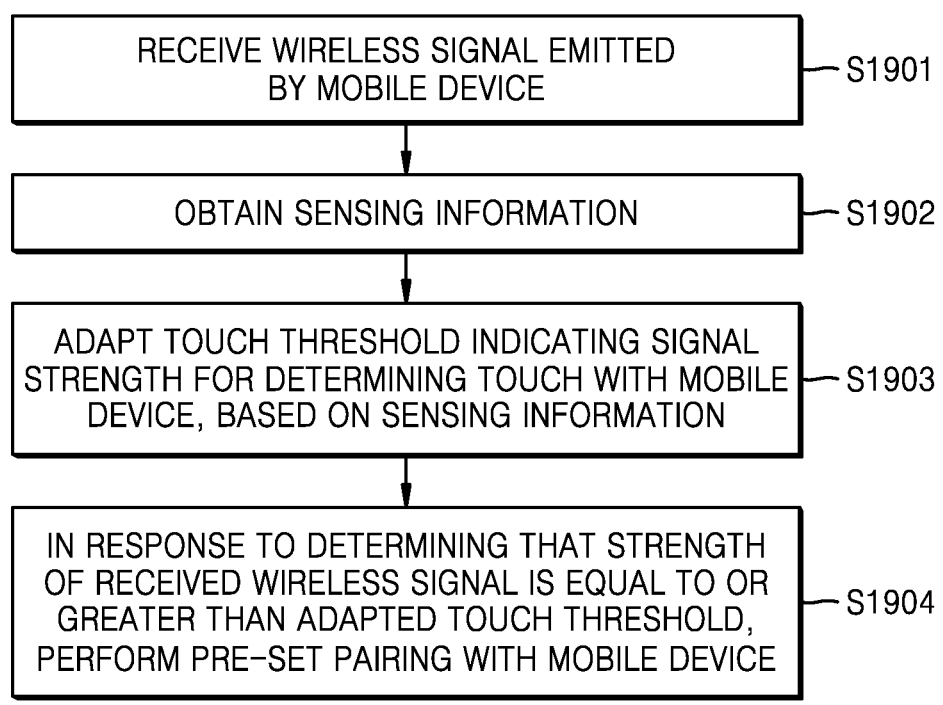
FIG. 18 is a table for describing another example of adapting a touch threshold based on an attenuation degree of a received signal according to movement of a mobile device, according to an embodiment.
FIG. 19 is a flowchart of an operating method of an electronic device, according to an embodiment.

FIG. 16 is a flowchart of an example of adapting a touch threshold based on an attenuation degree of a received signal according to movement of the mobile device 100, according to an embodiment of the disclosure. FIG. 17 is a table for describing an example of adapting a touch threshold based on an attenuation degree of a received signal according to movement of the mobile device 100, according to an embodiment of the disclosure. FIG. 18 is a table for describing another example of adapting a touch threshold based on an attenuation degree of a received signal according to movement of the mobile device 100, according to an embodiment of the disclosure.

The flowchart of FIG. 16 will be described with reference to FIGS. 17 and 18. In operation S1601, the mobile device 100 may obtain strength information of a wireless signal emitted from the electronic device 200, based on identification information of the electronic device 200.

Referring to FIG. 17, strength 1702 of an emitted wireless signal may be distinguished for each model 1701 of an electronic device. For example, a default value of strength of an emitted wireless signal may be set differently for each model of the electronic device 200.

In operation S1602, the mobile device 100 may identify an attenuation degree of a received signal according to movement of the mobile device 100.

Referring to FIG. 18, strength of a received signal may be differently sensed because an attenuation degree 1802 of a received signal is different for each inclination 1801 of a mobile device.

For example, when an inclination of the mobile device 100 is 90°, strength of a received signal may be sensed to be a value attenuated by about −10 dB.

In operation S1603, the mobile device 100 may determine an adaptation degree of a touch threshold, based on the obtained strength information and the attenuation degree of the received signal.

According to an embodiment of the disclosure, the mobile device 100 may determine the adaptation degree of the touch threshold for determining a touch with the electronic device 200, based on the strength information of the wireless signal emitted from the electronic device 200 and the attenuation degree of the received signal according to the movement of the mobile device 100.

For example, referring to FIGS. 17 and 18, the mobile device 100 may adapt the touch threshold for determining the touch with the electronic device 200, based on an attenuation degree, for example, −5 dB, of a received signal when strength of a wireless signal corresponding to a model name, for example 1xxxyz23, of an electronic device is −10 to 10 dBm and an inclination of a mobile device is 45°.

In operation S1604, the mobile device 100 may adapt the touch threshold based on the determined adaptation degree.

According to an embodiment of the disclosure, the mobile device 100 may determine a touch with the electronic device 200 based on the adapted touch threshold.

FIGS. 16 through 18 are diagrams for describing an embodiment of the disclosure and thus do not limit the disclosure.

FIG. 19 is a flowchart of an operating method of the electronic device 200, according to an embodiment of the disclosure.

According to an embodiment of the disclosure, the electronic device 200 may perform pre-set pairing with the mobile device 100 closely touching the electronic device 200. According to an embodiment of the disclosure, the electronic device 200 may be conveniently paired with the mobile device 100 by determining that the mobile device 100 touched the electronic device 200.

In operation S1901 of FIG. 19, the electronic device 200 may receive a wireless signal emitted by the mobile device 100.

According to an embodiment of the disclosure, the mobile device 100 may broadcast the wireless signal in pre-set periods to scan neighboring devices. For example, the electronic device 200 may receive a Wi-Fi signal broadcasted by the mobile device 100 in pre-set periods.

Also, in response to the received wireless signal, the electronic device 200 may broadcast a wireless signal, for example, a Wi-Fi signal, in pre-set periods.

In operation S1902, the electronic device 200 may obtain sensing information.

According to an embodiment of the disclosure, the sensing information may denote information sensed via an embedded sensor as a device moves. According to an embodiment of the disclosure, the sensing information may include information about movement of the mobile device 100. Also, the sensing information may include information about movement of the electronic device 200.

According to an embodiment of the disclosure, the electronic device 200 may receive the sensing information regarding movement of the mobile device 100, from the mobile device 100. As the mobile device 100 moves to approach the electronic device 200, the mobile device 100 may obtain the sensing information regarding movement via the sensing unit 1400 of FIG. 24 and transmit the sensing information to the electronic device 200.

Also, according to an embodiment of the disclosure, the electronic device 200 may obtain the sensing information via sensors such as a sensing unit 2400 of FIG. 25, for example, an acceleration sensor, mounted on the electronic device 200.

For example, when the electronic device 200 is impacted as the mobile device 100 touches the electronic device 200, the electronic device 200 may detect an impact via an acceleration sensor embedded in the electronic device 200 and obtain the sensing information.

In operation S1903, the electronic device 200 may adapt a touch threshold indicating a signal strength for determining a touch with the mobile device 100, based on the sensing information.

According to an embodiment of the disclosure, the electronic device 200 may adapt the touch threshold for determining a touch with the mobile device 100, based on the sensing information including an inclination, moving speed, acceleration, or the like of the mobile device 100.

For example, strength of a signal from the mobile device 100 sensed by the electronic device 200 may vary within a certain range depending on an inclination of the mobile device 100 when the mobile device 100 closely touches the electronic device 200 or a moving speed immediately before the mobile device 100 approaches the electronic device 200.

According to an embodiment of the disclosure, by lowering the touch threshold for determining a touch with the mobile device 100 based on the sensing information of the mobile device 100 received by the electronic device 200 from the mobile device 100, pairing between devices may be smoothly performed in various touch conditions.

Also, according to an embodiment of the disclosure, the electronic device 200 may adapt the touch threshold for determining a touch with the mobile device 100 based on the sensing information, when the sensing unit 2400 is obtained by the sensing unit 2400 embedded in the electronic device 200. The electronic device 200 may lower the touch threshold based on the sensing information of the electronic device 200, thereby smoothly performing pairing with the mobile device 100, based on an error range in various touch conditions.

According to an embodiment of the disclosure, the electronic device 200 may calculate strength of the wireless signal received from the mobile device 100 in pre-set periods. When it is determined that the calculated strength of the wireless signal is equal to or greater than the touch threshold adapted in operation S1903, the electronic device 200 may determine that the mobile device 100 touched the electronic device 200.

In operation S1904, in response to determining that the strength of the received wireless signal is equal to or greater than the adapted touch threshold, the electronic device 200 may perform pre-set pairing with the mobile device 100.

According to an embodiment of the disclosure, in response to determining the touch with the mobile device 100, the electronic device 200 may perform the pre-set pairing with the mobile device 100. For example, the electronic device 200 may perform pairing with the mobile device 100 via Wi-Fi direct communication connection by using a WFD communicator.

FIG. 19 illustrates an embodiment of the disclosure and the disclosure is not limited thereto.

Figure 20:
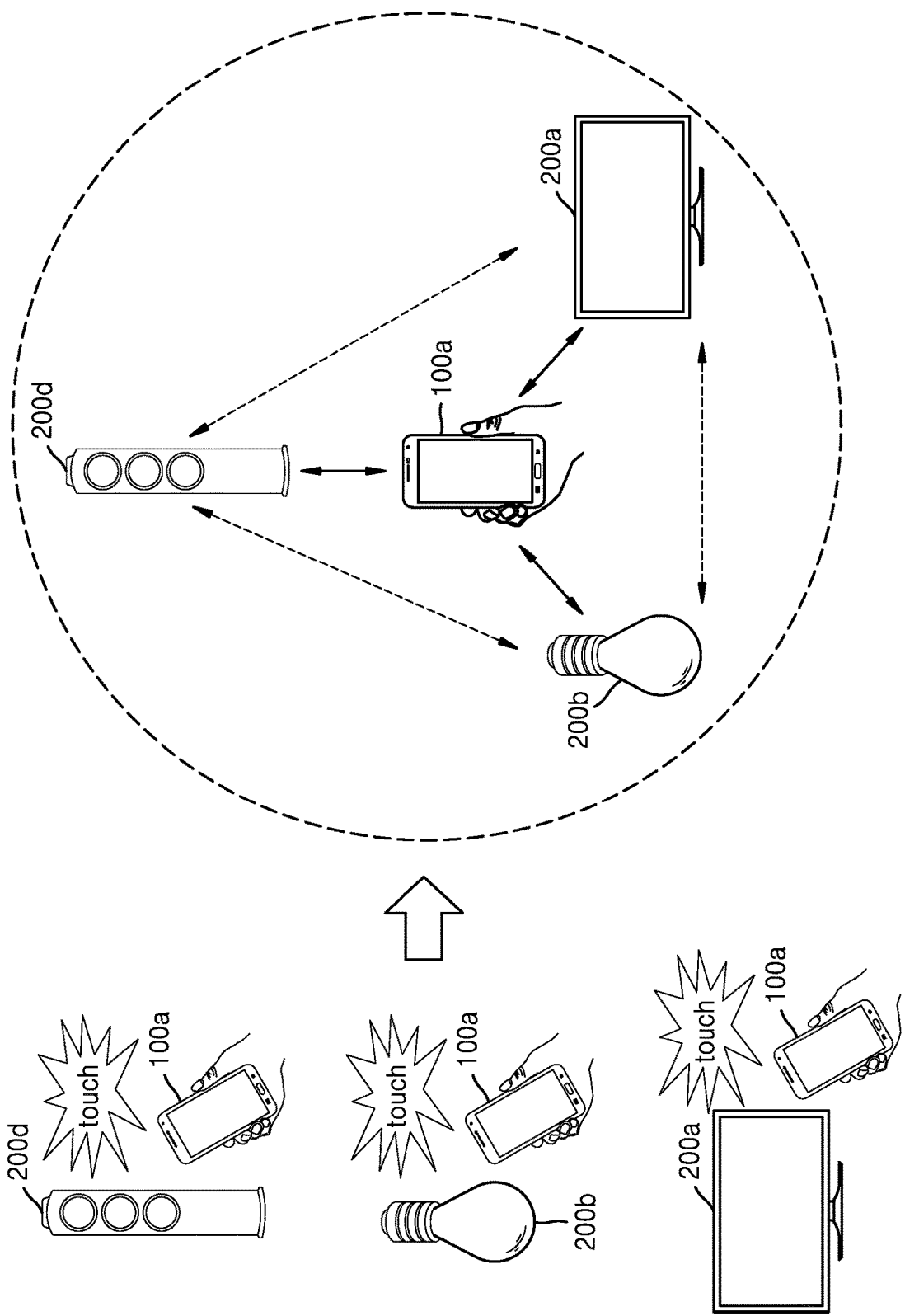
FIG. 20 is a diagram for describing an example in which a mobile device performs pairing with a plurality of electronic devices, according to an embodiment.

FIG. 20 is a diagram for describing an example in which the mobile device 100 performs pairing with a plurality of the electronic devices 200, according to an embodiment of the disclosure.

According to an embodiment of the disclosure, the smart phone 100*a* may perform communication pairing with the plurality of electronic devices 200.

For example, when the smart phone 100*a* touches the light bulb 200*b*, the smart phone 100*a* and the light bulb 200*b* may perform pre-set pairing. Also, for example, when the smart phone 100*a* touches the TV 200*a*, the smart phone 100*a* and the TV 200*a* may perform pre-set pairing. Also, for example, when the smart phone 100*a* touches the air conditioner 200*d*, the smart phone 100*a* and the air conditioner 200*d* may perform pre-set pairing.

According to an embodiment of the disclosure, the smart phone 100*a* may activate a pre-set service by being paired with the plurality of electronic devices 200.

For example, the smart phone 100*a* may be paired with the plurality of electronic devices 200 and remotely control the plurality of electronic devices 200. For example, the smart phone 100*a* may transmit, to the air conditioner 200*d*, a signal of controlling at least one function of the air conditioner 200*d*.

Also, according to an embodiment of the disclosure, when the mobile device 100 touched the plurality of electronic devices 200, the plurality of electronic devices 200 may be controlled to perform pairing therebetween based on the mobile device 100.

According to an embodiment of the disclosure, the mobile device 100 may transmit identification information of the air conditioner 200*d* to the TV 200*a* and transmit identification information of the TV 200*a* to the air conditioner 200*d*.

For example, when the TV 200*a* and the air conditioner 200*d* are paired, at least one function of the air conditioner 200*d* may be controlled via the TV 200*a*.

Also, according to an embodiment of the disclosure, when certain authentication is performed, pairing may be performed between the plurality of electronic devices 200 based on the mobile device 100.

Also, according to an embodiment of the disclosure, the mobile device 100 may transmit communication connection information, for example, Wi-Fi connection information of the plurality of electronic devices 200 to the plurality of electronic devices 200 to be shared by the plurality of electronic devices 200.

FIG. 20 illustrates an embodiment of the disclosure and the disclosure is not limited thereto.

Figure 21:
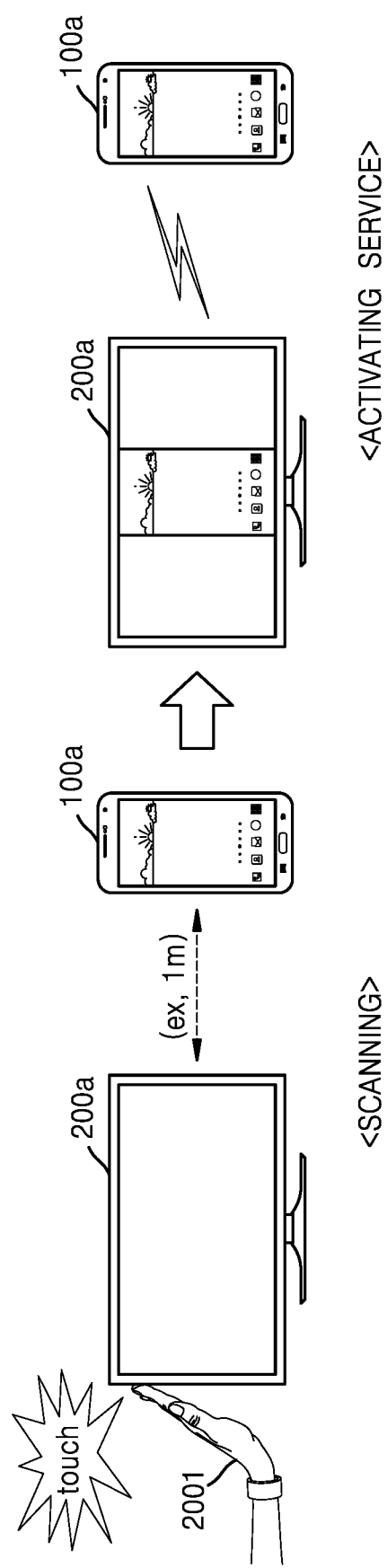
FIG. 21 is a diagram for describing an example of performing pairing between a mobile device and an electronic device, according to an embodiment.

FIG. 21 is a diagram for describing an example of performing pairing between the mobile device 100 and the electronic device 200, according to an embodiment of the disclosure.

For example, when a user touches the TV 200*a* with a hand 2001, the TV 200*a* may shake due to an impact by the hand 2001. At this time, the TV 200*a* may obtain sensing information regarding movement of the TV 200*a* via the sensing unit 2400 of FIG. 25.

According to an embodiment of the disclosure, the TV 200*a* may determine that a mobile device such as smart phone 100*a* is located within a certain distance, based on strength of a wireless signal received from the smart phone 100*a*, and perform pairing with the smart phone 100*a* located within the certain distance upon detecting the impact by the hand 2001 of the user.

According to an embodiment of the disclosure, the TV 200*a* may perform pre-set pairing, based on a past pairing history with the smart phone 100*a* closely located within a certain distance for example 1 m.

For example, the TV 200*a* may perform Bluetooth communication connection with the smart phone 100*a* when there is a history of Bluetooth communication connection with the smart phone 100*a* regarding output data sharing using screen mirroring, and execute an application for the screen mirroring.

According to an embodiment of the disclosure, the electronic device 200 may determine a touch input by a user's hand touching the electronic device 200 as a pairing intention with an external device. The electronic device 200 may perform pairing with the external device such as the mobile device 100 closest to the electronic device 200.

According to an embodiment of the disclosure, because the user is located within a close distance and the mobile device 100 of the user is located, the electronic device 200 may surmise an intention of communication connection between the mobile device 100 and the electronic device 200 and control the communication connection to be performed.

FIG. 21 illustrates an embodiment of the disclosure and the disclosure is not limited thereto.

Figure 22:
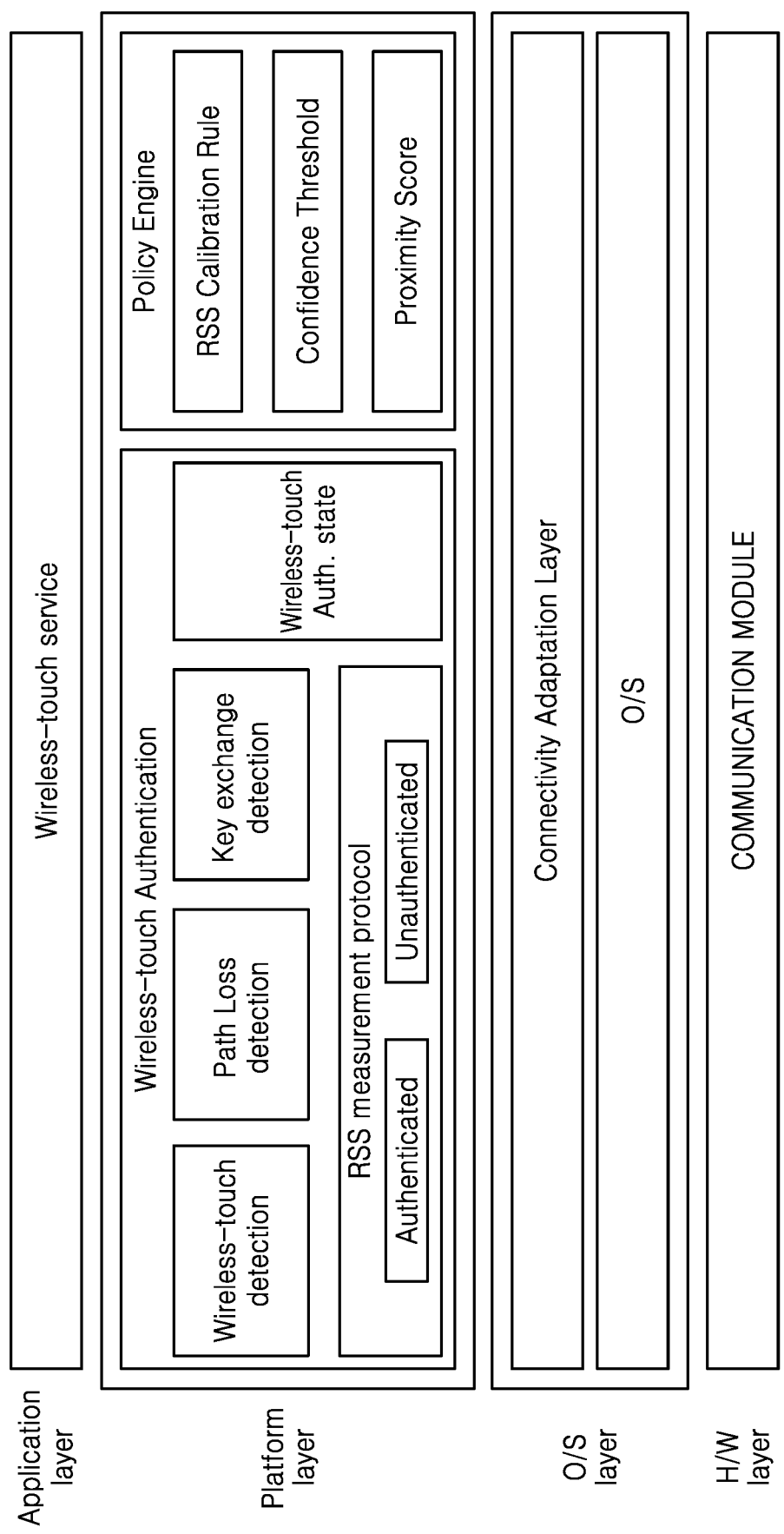
FIG. 22 is a diagram for describing a software architecture of a mobile device, according to an embodiment.

FIG. 22 is a diagram for describing a software architecture of a mobile device, according to an embodiment of the disclosure.

FIG. 22 illustrates an example of a software structure including a plurality of layers.

An application layer may include an application for providing a certain service during pairing via proximity recognition between devices. For example, the application for providing a certain service may include a screen mirroring application, a sound mirroring application, or the like, and is not limited thereto.

A platform layer may include a wireless-touch authentication module and a policy engine module for authentication between devices.

For example, the wireless-touch authentication module may include modules for proximity recognition and authentication between devices (for example, a wireless-touch detection module, a path loss detection module, a key exchange algorithm module, an RSS measurement protocol, and a wireless-touch authentication state module).

For example, the policy engine module may include modules for managing rules/policies for proximity recognition and authentication for each device or service (for example, an RSS calibration rule, a confidence threshold, and a proximity score).

An operating system (O/S) layer may include an O/S and a connectivity adaptation layer on the O/S.

The O/S may manage computer resources of a central processing unit (CPU), a main storage device, and an input/output (I/O) device while operating as an interface between hardware and application programs (applications). For example, the O/S may be Android, Windows, TIZEN, web O/S, UNIX, Linux, MAC O/S, or the like.

Also, the connectivity adaptation layer may be a layer for connectivity application program interface (API) matching for each O/S. For example, the connectivity adaptation layer may include programs required for Bluetooth connection, Bluetooth disconnection, device discovery, and the like for each O/S.

A hardware (H/W) layer may include a communication module. Also, the H/W layer may include a processor, a memory, a display, an input device, and the like, and may further include an additional hardware device, such as a microphone, a speaker, a power supply, a detachable memory, an antenna, a radio wave transceiver, a global positioning system (GSP), a camera, a motion sensor, a magnetic sensor, a proximity sensor, or illumination sensor, but is not limited thereto.

FIG. 22 illustrates an embodiment of the disclosure and the disclosure is not limited thereto.

Figure 23:
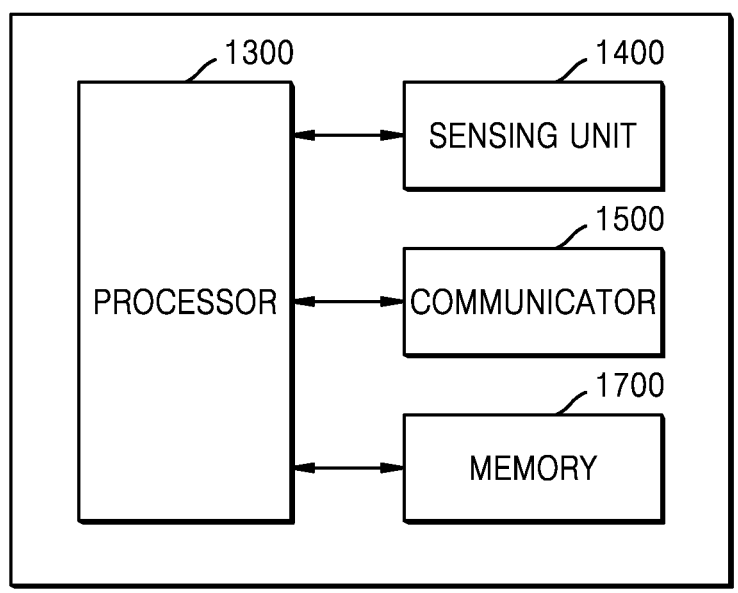
FIG. 23 is a block diagram of a mobile device according to an embodiment.

FIG. 23 is a block diagram of the mobile device 100 according to an embodiment of the disclosure. FIG. 24 is a detailed block diagram of the mobile device 100 according to an embodiment of the disclosure.

As shown in FIG. 23, the mobile device 100 according to an embodiment of the disclosure may include the sensing unit 1400, the communicator 1500, a memory 1700, and a processor 1300. However, the components shown in FIG. 23 are not all essential components of the mobile device 100. The mobile device 100 may include more or fewer components than those shown in FIG. 23.

For example, as shown in FIG. 24, the mobile device 100 according to some embodiments of the disclosure may further include a user input interface 1100, an output interface 1200, an audio/video (A/V) input interface 1600 in addition to the sensing unit 1400, the communicator 1500, the memory 1700, and the processor 1300.

The user input interface 1100 is a unit into which data for a user to control the mobile device 100 is input. For example, the user input interface 1100 may include a key pad, a dome switch, a touch pad (contact capacitance type, pressure resistive type, an infrared (IR) detection type, surface ultrasonic wave conduction type, integral tension measuring type, piezo-effect type, or the like), a jog wheel, a jog switch, or the like, but is not limited thereto. Also, the user input interface 1100 may be connected to a microphone 1620 to receive a voice input for controlling the mobile device 100.

The output interface 1200 may output an audio signal, a video signal, or a vibration signal, and the output interface 1200 may include the display 1210 and a sound output interface 1220.

The display 1210 displays information processed by the mobile device 100.

According to an embodiment of the disclosure, the display 1210 may display information related to communication connection with an external device, under control of the processor 1300.

Also, according to an embodiment of the disclosure, the display 1210 may display a user interface (UI) related to communication connection with an external device, under control of the processor 1300.

When the display 1210 is configured as a touch screen by forming a layer structure with a touch pad, the display 1210 may be used as an input device as well as an output device. The display 1210 may include at least one of a liquid crystal display, a thin-film transistor-liquid crystal display, an organic light-emitting diode, a flexible display, a 3-dimensional (3D) display, or an electrophoretic display.

Also, the display 1210 may include a light-emitting device. The light-emitting device may include, for example, a light-emitting diode and a display panel, but is not limited thereto.

The sound output interface 1220 outputs sound data received from the communicator 1500 or stored in the memory 1700. A vibration motor may output a vibration signal.

The processor 1300 generally controls all operations of the mobile device 100. For example, the processor 1300 may execute programs stored in the memory 1700 to control the user input interface 1100, the output interface 1200, the sensing unit 1400, the communicator 1500, and the AN input interface 1600 in general. The processor 1300 may control operations of the mobile device 100 to perform functions of the mobile device 100 described with reference to FIGS. 1 through 21.

The processor 1300 may be configured as one or more processors. In this case, the one or more processors may be a general-purpose processor such as a central processing unit (CPU), an application processor (AP), or a digital signal processor (DSP), or a dedicated graphics processor such as a graphical processing unit (GPU) or a vision processing unit (VPU). The one or more processors may control input data to be processed according to predefined operation rules stored in the memory 1700.

According to an embodiment of the disclosure, the processor 1300 may receive a wireless signal emitted by the electronic device 200, through the communicator 1500.

Also, the processor 1300 may emit a wireless signal of a pre-set default value in pre-set periods and emit a wireless signal with strength amplified to a pre-set maximum value in response to determining that the strength of a received wireless signal is equal to or greater than a proximity threshold, via the communicator 1500.

Also, in response to determining that the strength of the received wireless signal is equal to or greater than the proximity threshold indicating a signal strength for determining proximity to the electronic device 200, the processor 1300 may obtain sensing information about movement of the mobile device 100 by using the sensing unit 1400. Also, the processor 1300 may adapt a touch threshold indicating a signal strength for determining a touch with the electronic device 200, based on the sensing information.

Also, in response to determining that the strength of the received wireless signal is equal to or greater than the adapted touch threshold, the processor 1300 may perform pre-set pairing with the electronic device 200.

Also, the processor 1300 may receive authentication information for authenticating the electronic device 200 via the communicator 1500 and perform pairing with the electronic device 200 based on the authentication information.

Also, the processor 1300 may receive identification information for identifying the electronic device 200 via the communicator 1500 and adapt the touch threshold based on the identification information of the electronic device 200.

Also, the processor 1300 may obtain strength information of a wireless signal emitted from the electronic device 200, based on the identification information of the electronic device 200. The processor 1300 may identify an attenuation degree of a received signal according to movement of the mobile device 100, based on the sensing information. The processor 1300 may determine an adaptation degree of the touch threshold based on the obtained strength information and the attenuation degree of the received signal, and adapt the touch threshold based on the determined adaptation degree.

The processor 1300 may determine the adaptation degree of the touch threshold according to a pre-set adaptation standard corresponding to the sensing information of the mobile device 100 and the identification information of the electronic device 200.

Also, upon pairing with the electronic device 200, the processor 1300 may active an application for at least one service from among screen mirroring, data sharing, and device setting registration.

The sensing unit 1400 may detect a state of the mobile device 100 or a state around the mobile device 100 and transmit detected information to the processor 1300.

The sensing unit 1400 may include at least one of the magnetic sensor 1410, the acceleration sensor 1420, a temperature/humidity sensor 1430, an infrared sensor 1440, a gyroscope sensor 1450, a position sensor 1460 (for example, a GPS), an atmospheric pressure sensor 1470, a proximity sensor 1480, or a red, green, blue (RGB) sensor 1490, illumination sensor, but is not limited thereto. Because functions of each sensor can be intuitively inferred by one of ordinary skill in the art from the name, detailed descriptions thereof will be omitted.

According to an embodiment of the disclosure, the sensing unit 1400 may detect movement of the mobile device 100. According to an embodiment of the disclosure, the mobile device 100 may obtain information about movement (for example, a moving speed or acceleration) or information about an inclination of the mobile device 100 via the sensing unit 1400.

The communicator 1500 may include one or more components enabling the mobile device 100 to communicate with an external device. For example, the communicator 1500 may include a short-range wireless communicator 1510, a mobile communicator 1520, and a broadcast receiver 1530.

The short-range wireless communicator 1510 may include a Bluetooth communicator, a Bluetooth low energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra-wideband (UWB) communicator, or an Ant+ communicator, but is not limited thereto.

The mobile communicator 1520 may transmit or receive a wireless signal to or from at least one of a base station, an external terminal, or a server, on a mobile communication network. Here, the wireless signal may include various types of data according to exchange of a voice call signal, an image call signal, or a text/multimedia message.

The broadcast receiver 1530 may receive a broadcast signal and/or information related to a broadcast from an external source through a broadcast channel. The broadcast channel may include a satellite channel or a terrestrial channel. According to an implementation example, the mobile device 100 may not include the broadcast receiver 1530.

The A/V input interface 1600 is a unit into which an audio signal or a video signal is input, and may include a camera 1610 and the microphone 1620.

The camera 1610 may obtain an image frame such as a still image or moving image via an image sensor in an image call mode or photographing mode. An image captured via the image sensor may be processed via the processor 1300 or a separate image processor.

The image frame processed by the camera 1610 may be stored in the memory 1700 or transmitted to an external device via the communicator 1500. There may be two or more cameras 1610 according to an implementation of the mobile device 100.

The microphone 1620 receives an external sound signal and processes the external sound signal to electric voice data. For example, the microphone 1620 may receive a sound signal from an external device or an utterer. The microphone 1620 may use various noise removal algorithms to remove noise generated while the external sound signal is received.

The memory 1700 may store programs for processes and controls of the processor 1300 and may store data input to or output from the mobile device 100.

The memory 1700 may include at least one type of storage medium among a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the memory 1700 may be classified into a plurality of modules based on functions, and for example, may be classified into a UI module 1710, a touch screen module 1720, a notification module 1730, and an image filter module.

The UI module 1710 may provide a specialized UI or graphics user interface (GUI), which interoperates with the mobile device 100 for each application. The touch screen module 1720 may detect a touch gesture of the user on a touch screen and transmit information about the touch gesture to the processor 1300. The touch screen module 1720 according to an embodiment of the disclosure may recognize and analyze a touch code. The touch screen module 1720 may be configured as separate hardware including a controller.

The notification module 1730 may generate a signal for notifying event occurrence of the mobile device 100. Examples of an event occurring in the mobile device 100 may include schedule notification, information notification related to completion of performing a voice command, a key signal input, and the like. The notification module 1730 may output a notification signal in a form of a video signal via the display 1210 or in a form of an audio signal via the sound output interface 1220.

FIG. 25 is a block diagram of the electronic device 200 according to an embodiment of the disclosure.

The electronic device 200 according to an embodiment of the disclosure may include at least some of the components shown in FIGS. 23 and 24.

As shown in FIG. 25, the electronic device 200 according to an embodiment of the disclosure may include a memory 2700, the communicator 2500, the sensing unit 2400, and a processor 2300. However, the components shown in FIG. 25 are not all essential components of the electronic device 200. The electronic device 200 may include more or fewer components than those shown in FIG. 25.

According to an embodiment of the disclosure, the processor 2300 generally controls all operations of the electronic device 200. For example, the processor 2300 may execute the programs stored in the memory 2700 to control the sensing unit 2400 and the communicator 2500 in general. The processor 2300 may control operations of the electronic device 200 to perform functions of the electronic device 200 described with reference to FIGS. 1 through 21.

The processor 2300 may be configured as one or more processors. In this case, the one or more processors may be a general-purpose processor such as a CPU, an AP, or a DSP, or a dedicated graphics processor such as a GPU or a VPU. The one or more processors may control input data to be processed according to predefined operation rules stored in the memory 2700.

According to an embodiment of the disclosure, the processor 2300 may receive a wireless signal emitted by the mobile device 100, through the communicator 2500.

According to an embodiment of the disclosure, the processor 2300 may obtain sensing information via the sensing unit 2400. Also, the processor 2300 may obtain the sensing information from the mobile device 100 via the communicator 2500.

Also, the processor 2300 may adapt a touch threshold indicating a signal strength for determining a touch with the mobile device 100, based on the sensing information.

Also, in response to determining that the strength of the received wireless signal is equal to or greater than the adapted touch threshold, the processor 2300 may perform pre-set pairing with the mobile device 100.

According to an embodiment of the disclosure, the memory 2700 of the electronic device 200 may store programs for processes and controls of the processor 2300, and may store data input to or output from the electronic device 200.

The memory 2700 may include at least one type of storage medium among a flash memory type, a hard disk type, a multimedia card micro type, a card type memory (for example, a SD or an XD memory), RAM, SRAM, ROM, EEPROM, PROM, a magnetic memory, a magnetic disk, and an optical disk.

Also, according to an embodiment of the disclosure, the communicator 2500 may include one or more components enabling the electronic device 200 to communicate with an external device. For example, the communicator 2500 may include a short-range wireless communicator, a mobile communicator, and a broadcast receiver.

The short-range wireless communicator may include a Bluetooth communicator, a BLE communicator, a near field communicator, a WLAN (Wi-Fi) communicator, a Zigbee communicator, an IrDA communicator, a WFD communicator, a UWB communicator, or an Ant+ communicator, but is not limited thereto.

The mobile communicator may transmit or receive a wireless signal to or from at least one of a base station, an external terminal, or a server, on a mobile communication network. Here, the wireless signal may include various types of data according to exchange of a voice call signal, an image call signal, or a text/multimedia message.

The broadcast receiver may receive a broadcast signal and/or information related to a broadcast from an external source through a broadcast channel. The broadcast channel may include a satellite channel or a terrestrial channel. According to an implementation example, the electronic device 200 may not include the broadcast receiver.

The sensing unit 2400 may detect a state of the electronic device 200 or a state around the electronic device 200 and transmit detected information to the processor 2300.

The sensing unit 2400 may include at least one of a magnetic sensor, an acceleration sensor, a temperature/humidity sensor, an infrared sensor, a gyroscope sensor, a position sensor (for example, GPS), an atmospheric pressure sensor, a proximity sensor, or an RGB sensor (illumination sensor), but is not limited thereto. Because functions of each sensor can be intuitively inferred by one of ordinary skill in the art from the name, detailed descriptions thereof will be omitted.

According to an embodiment of the disclosure, the sensing unit 2400 may detect an external impact applied to the electronic device 200. According to an embodiment of the disclosure, the acceleration sensor embedded in the electronic device 200 may detect an impact caused by a touch of the mobile device 100.

According to an embodiment of the disclosure, the electronic device 200 may obtain sensing information via the sensing unit 2400.

Meanwhile, the above-described embodiments of the disclosure may be written as a program executable on a computer and may be implemented in a general-purpose digital computer operating the program using a computer-readable recording medium. In addition, a structure of the data used in the above-described embodiments of the disclosure may be recorded on a computer-readable medium through various methods. The above-described embodiments of the disclosure may also be implemented in a form of a computer-readable recording medium including instructions executable by a computer, such as a program module to be executed by a computer. For example, methods implemented as a software module or algorithm may be stored as computer-readable and executable codes or program instructions in a computer-readable recording medium.

The computer-readable recording medium may be an arbitrary recording medium accessible by a computer, and examples thereof may include volatile and non-volatile media and separable and non-separable media. The computer-readable recording medium may include, but is not limited to, a magnetic storage medium, for example, read-only memory (ROM), floppy disk, hard disk, or the like, an optical storage medium, for example, CD-ROM, DVD, or the like. Further, examples of the computer-readable recording medium may include a computer storage medium and a communication medium.

Also, a plurality of computer-readable recording media may be distributed over network-coupled computer systems, and data stored in the distributed recording media, for example, program instructions and codes, may be executed by at least one computer.

Certain executions described herein are only an embodiment of the disclosure and do not limit the scope of the disclosure in any way. For brevity of the specification, general electronic configurations, control systems, software, and other functional aspects of systems may be omitted.

The above description of the disclosure is provided for illustration, and it will be understood by those of ordinary skill in the art that various changes in form and details may be readily made therein without departing from essential features and the scope of the disclosure as defined by the following claims. Accordingly, the above embodiments of the disclosure are examples only in all aspects and are not limited. For example, each component described as a single type may be implemented in a distributed manner, and similarly, components described as distributed may be implemented in a combined form.

In the disclosure, the use of all examples or exemplary terms, such as "etc.", is merely for describing the disclosure in detail and the scope of the disclosure is not limited by those examples or exemplary terms unless defined in the claims.

Also, elements described herein may not be essential elements for implementation of the disclosure unless the elements are particularly described as being "essential" or "critical".

One of ordinary skill in the art will understand that the disclosure may be implemented in a modified form without departing from the essential features of the disclosure.

It should be understood that various changes in form and details may be made in the embodiments of the disclosure and that the embodiments of the disclosure cover all modifications, equivalents, and alternatives falling within the scope of the disclosure. Therefore, the embodiments of the disclosure should be considered in descriptive sense only and not for purposes of limitation.

The scope of the disclosure is defined by the appended claims rather than the detailed description, and all changes or modifications within the scope of the appended claims and their equivalents will be construed as being included in the scope of the disclosure.

In addition, terms such as "unit" and "module" described in the specification denote a unit that processes at least one function or operation, which may be implemented in hardware or software, or implemented in a combination of hardware and software.

The "unit" or "module" is stored in an addressable storage medium and may be implemented by a program executable by a processor.

For example, the "unit" or "module" may be implemented by software components, object-oriented software components, class components, and task components, and may include processes, functions, attributes, procedures, subroutines, segments of program code, drivers, firmware, micro codes, circuits, data, a database, data structures, tables, arrays, or variables.

As used herein, the expression "A may include one of a1, a2, and a3" broadly means that an exemplary element that may be included in the element A is a1, a2, or a3.

The expression does not necessarily limit the element that may be included in element A, to a1, a2, or a3. Therefore, it should be noted that the expression is not restrictively construed to exclude elements other than a1, a2, and a3, from the element that may be included in A.

The expression means that A may include a1, include a2, or include a3. The expression does not mean that the elements included in A are always selectively determined within a certain set. For example, it should be noted that the expression is not restrictively construed to limit that a1, a2, or a3 selected from a set including a1, a2, and a3 is necessarily included in the element A.

What is claimed is:

1. An operating method of a mobile device for performing pairing with an electronic device, the operating method comprising:
   receiving a reception wireless signal from the electronic device;
   in response to determining that a strength of the reception wireless signal is equal to or greater than a proximity threshold for determining proximity to the electronic device, obtaining sensing information about a movement of the mobile device using at least one sensor of the mobile device;
   based on the sensing information, adapting a touch threshold indicating a wireless signal strength for determining a touch with the electronic device; and
   in response to determining that the strength of the reception wireless signal is equal to or greater than the adapted touch threshold, performing the pairing with the electronic device.

2. The operating method of claim 1, further comprising transmitting a transmission wireless signal having a pre-set default value according to a pre-set period,
   wherein based on determining that the strength of the reception wireless signal is equal to or greater than the proximity threshold, a strength of the transmission wireless signal is amplified to a pre-set maximum value.

3. An operating method of a mobile device for performing pairing with an electronic device, the operating method comprising:
   receiving a reception wireless signal from the electronic device;
   in response to determining that a strength of the reception wireless signal is equal to or greater than a proximity threshold for determining proximity to the electronic device, obtaining sensing information about a movement of the mobile device using at least one sensor of the mobile device;
   adapting a touch threshold for determining a touch with the electronic device, based on the sensing information; and
   in response to determining that the strength of the reception wireless signal is equal to or greater than the adapted touch threshold, performing the pairing with the electronic device,
   wherein the operating method further comprises transmitting a transmission wireless signal having a pre-set default value according to a pre-set period,
   wherein based on determining that the strength of the reception wireless signal is equal to or greater than the proximity threshold, a strength of the transmission wireless signal is amplified to a pre-set maximum value, and
   wherein a strength of a response wireless signal received from the electronic device in response to the transmission wireless signal is amplified to a value corresponding to the pre-set maximum value.

4. The operating method of claim 1, wherein the sensing information comprises at least one of information about the movement of the mobile device or information about an inclination of the mobile device.

5. The operating method of claim 1, further comprising receiving authentication information for authenticating the electronic device,
   wherein the pairing is performed based on the authentication information.

6. An operating method of a mobile device for performing pairing with an electronic device, the operating method comprising:
   receiving a reception wireless signal from the electronic device;
   in response to determining that a strength of the reception wireless signal is equal to or greater than a proximity threshold for determining proximity to the electronic device, obtaining sensing information about a movement of the mobile device using at least one sensor of the mobile device;
   adapting a touch threshold for determining a touch with the electronic device, based on the sensing information; and
   in response to determining that the strength of the reception wireless signal is equal to or greater than the adapted touch threshold, performing the pairing with the electronic device;
   wherein the operating method further comprises receiving identification information for identifying the electronic device, and
   wherein the touch threshold is adapted based on the identification information of the electronic device.

7. The operating method of claim 6, further comprising:
   obtaining strength information of the reception wireless signal based on the identification information of the electronic device;
   identifying an attenuation degree of the reception wireless signal according to the movement of the mobile device, based on the sensing information;
   determining an adaptation degree of the touch threshold, based on the obtained strength information and the attenuation degree; and
   adapting the touch threshold based on the determined adaptation degree.

8. The operating method of claim 6, wherein the adapting of the touch threshold comprises determining an adaptation degree of the touch threshold, based on a pre-set adaptation standard corresponding to the identification information of the electronic device and the sensing information of the mobile device.

9. The operating method of claim 1, further comprising transmitting, to the electronic device, the sensing information about the movement of the mobile device,
 wherein the transmitted sensing information is used to adapt a threshold for determining that the electronic device has touched the mobile device.

10. The operating method of claim 1, further comprising, based on performing the pairing with the electronic device, activating an application for at least one service from among screen mirroring, data sharing, and device setting registration.

11. An operating method of an electronic device for performing pairing with a mobile device, the operating method comprising:
 receiving a reception wireless signal from the mobile device;
 obtaining sensing information caused by a movement of the mobile device;
 based on the sensing information, adapting a touch threshold indicating a wireless signal strength for determining a touch with the mobile device; and
 in response to determining that a strength of the reception wireless signal is equal to or greater than the adapted touch threshold, performing the pairing with the mobile device.

12. A mobile device for performing pairing with an electronic device, the mobile device comprising:
 a communication interface;
 at least one sensor;
 a memory configured to store one or more instructions; and
 a processor configured to execute the one or more instructions to:
  receive, through the communication interface, a reception wireless signal from the electronic device;
  in response to determining that a strength of the reception wireless signal is equal to or greater than a proximity threshold for determining proximity to the electronic device, obtain sensing information about a movement of the mobile device using the at least one sensor;
  based on the sensing information, adapt a touch threshold indicating a wireless signal strength for determining a touch with the electronic device; and
  in response to determining that the strength of the reception wireless signal is equal to or greater than the adapted touch threshold, perform the pairing with the electronic device.

13. The mobile device of claim 12, wherein the processor is further configured to execute the one or more instructions to:
 transmit, through the communication interface, a transmission wireless signal having a pre-set default value according to a pre-set period; and
 based on determining that the strength of the reception wireless signal is equal to or greater than the proximity threshold, a strength of the transmission wireless signal is amplified to a pre-set maximum value.

14. A mobile device for performing pairing with an electronic device, the mobile device comprising:
 a communication interface;
 at least one sensor;
 a memory configured to store one or more instructions; and
 a processor configured to execute the one or more instructions to:
  receive, through the communication interface, a reception wireless signal from the electronic device;
  in response to determining that a strength of the reception wireless signal is equal to or greater than a proximity threshold for determining proximity to the electronic device, obtain sensing information about a movement of the mobile device using the at least one sensor;
  adapt a touch threshold for determining a touch with the electronic device, based on the sensing information; and
  in response to determining that the strength of the reception wireless signal is equal to or greater than the adapted touch threshold, perform the pairing with the electronic device,
 wherein the processor is further configured to execute the one or more instructions to:
  transmit, through the communication interface, a transmission wireless signal having a pre-set default value according to a pre-set period; and
  based on determining that the strength of the reception wireless signal is equal to or greater than the proximity threshold, a strength of the transmission wireless signal is amplified to a pre-set maximum value,
 and
 wherein a strength of a response wireless signal received from the electronic device in response to the transmission wireless signal is amplified to a value corresponding to the pre-set maximum value.

15. The mobile device of claim 12, wherein the sensing information comprises at least one of information about the movement of the mobile device or information about an inclination of the mobile device.

16. The mobile device of claim 12, wherein the processor is further configured to execute the one or more instructions to:
 receive, through the communication interface, authentication information for authenticating the electronic device; and
 perform the pairing with the electronic device based on the authentication information.

17. A mobile device for performing pairing with an electronic device, the mobile device comprising:
 a communication interface;
 at least one sensor;
 a memory configured to store one or more instructions; and
 a processor configured to execute the one or more instructions to:
  receive, through the communication interface, a reception wireless signal from the electronic device;
  in response to determining that a strength of the reception wireless signal is equal to or greater than a proximity threshold for determining proximity to the electronic device, obtain sensing information about a movement of the mobile device using the at least one sensor;
  adapt a touch threshold for determining a touch with the electronic device, based on the sensing information; and
  in response to determining that the strength of the reception wireless signal is equal to or greater than the adapted touch threshold, perform the pairing with the electronic device,
 wherein the processor is further configured to execute the one or more instructions to:

receive, through the communication interface, identification information for identifying the electronic device; and adapt the touch threshold based on the identification information of the electronic device.

18. The mobile device of claim 17, wherein the processor is further configured to execute the one or more instructions to:

obtain strength information of the reception wireless signal based on the identification information of the electronic device;

identify an attenuation degree of the reception wireless signal according to the movement of the mobile device, based on the sensing information;

determine an adaptation degree of the touch threshold, based on the obtained strength information and the attenuation degree; and adapt the touch threshold based on the determined adaptation degree.

19. The mobile device of claim 17, wherein the processor is further configured to execute the one or more instructions to determine an adaptation degree of the touch threshold, based on a pre-set adaptation standard corresponding to the identification information of the electronic device and the sensing information of the mobile device.

20. The mobile device of claim 12, wherein the processor is further configured to execute the one or more instructions to, based on performing the pairing with the electronic device, activate an application for at least one service from among screen mirroring, data sharing, and device setting registration.

* * * * *